United States Patent
Koike et al.

(10) Patent No.: US 9,672,603 B2
(45) Date of Patent: Jun. 6, 2017

(54) IMAGE PROCESSING APPARATUS, IMAGE PROCESSING METHOD, DISPLAY APPARATUS, AND CONTROL METHOD FOR DISPLAY APPARATUS FOR GENERATING AND DISPLAYING A COMBINED IMAGE OF A HIGH-DYNAMIC-RANGE IMAGE AND A LOW-DYNAMIC-RANGE IMAGE

(71) Applicant: CANON KABUSHIKI KAISHA, Tokyo (JP)

(72) Inventors: Toru Koike, Tokyo (JP); Kazuhiko Nakazawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 14/605,606

(22) Filed: Jan. 26, 2015

(65) Prior Publication Data
US 2015/0213586 A1  Jul. 30, 2015

(30) Foreign Application Priority Data
Jan. 29, 2014  (JP) .................................. 2014-014514

(51) Int. Cl.
*G06T 5/00*  (2006.01)
(52) U.S. Cl.
CPC .... *G06T 5/007* (2013.01); *G06T 2207/20208* (2013.01); *G06T 2207/20221* (2013.01)
(58) Field of Classification Search
CPC ........... G06T 5/007; G06T 2207/20208; G06T 2207/20221
USPC ........................................................ 382/284
See application file for complete search history.

(56) References Cited

U.S. PATENT DOCUMENTS

| | | | |
|---|---|---|---|
| 7,730,401 B2 * | 6/2010 | Gillespie | G06F 3/0481 345/156 |
| 2008/0158614 A1 * | 7/2008 | Segawa | H04N 1/58 358/3.29 |
| 2009/0073275 A1 * | 3/2009 | Awazu | G03B 7/16 348/222.1 |

(Continued)

FOREIGN PATENT DOCUMENTS

| | | |
|---|---|---|
| JP | 2003-162275 A | 6/2003 |
| JP | 2011-193511 A | 9/2011 |
| WO | 2005/104035 A1 | 11/2005 |

OTHER PUBLICATIONS

Durand et al. ("Fast Bilateral Filtering for the Display of High-Dynamic-Range Images," Proceedings of ACM SIGGRAPH, Jul. 2002, pp. 257-266).*

*Primary Examiner* — Yubin Hung
(74) *Attorney, Agent, or Firm* — Cowan, Liebowitz & Latman, P.C.

(57) ABSTRACT

An image processing apparatus according to the present invention includes: a generating unit configured to generate a combined image in which a graphic image is combined on a non-combined image; and an outputting unit configured to output the combined image, wherein when generating a combined image in which a graphic image with a narrower dynamic range than the non-combined image is combined on the non-combined image, the generating unit generates a combined image in which brightness of at least one region among a region of the graphic image and a region of a periphery thereof is limited to a first threshold or lower.

30 Claims, 19 Drawing Sheets

(56) References Cited

U.S. PATENT DOCUMENTS

| | | | |
|---|---|---|---|
| 2010/0149197 A1* | 6/2010 | Plut | G06F 1/3218 345/522 |
| 2010/0325186 A1* | 12/2010 | Bates | G06F 7/4833 708/524 |
| 2011/0058109 A1* | 3/2011 | Nishigaki | G06F 3/0425 348/744 |
| 2011/0222761 A1* | 9/2011 | Haikin | G06T 5/00 382/162 |
| 2015/0010059 A1* | 1/2015 | Hattori | H04N 19/98 375/240.02 |
| 2015/0177906 A1* | 6/2015 | Yairi | G06T 3/0006 345/648 |
| 2015/0370318 A1* | 12/2015 | Yamaguchi | G06F 3/005 345/157 |

* cited by examiner

FIG. 3

| BRIGHTNESS VALUE | DISPLAY BRIGHTNESS [cd/m²] |
| --- | --- |
| 0 | 0 |
| 10 | 3 |
| 100 | 40 |
| 200 | 80 |
| 255 | 100 |
| 500 | 180 |
| 1000 | 220 |
| 2000 | 500 |
| 40000 | 1000 |
| 100000 | 10000 |

IMAGE PROCESSING APPARATUS, IMAGE PROCESSING METHOD, DISPLAY APPARATUS, AND CONTROL METHOD FOR DISPLAY APPARATUS FOR GENERATING AND DISPLAYING A COMBINED IMAGE OF A HIGH-DYNAMIC-RANGE IMAGE AND A LOW-DYNAMIC-RANGE IMAGE

BACKGROUND OF THE INVENTION

Field of the Invention

The present invention relates to an image processing apparatus, an image processing method, a display apparatus, and a control method for a display apparatus.

Description of the Related Art

In recent years, imaging apparatuses capable of capturing high-dynamic range images (HDR images) have been proposed. In addition, various types of formats have been proposed as data formats for HDR images.

One method of recording an HDR image involves dividing an HDR image into a base image and a tone map and recording the base image and the tone map (WO 2005/104035 and Japanese Patent Application Laid-open No. 2011-193511). In other words, one HDR image format is a format that uses a base image and a tone map. A base image is a down-sampled (gradation-compressed) image of an HDR image and is an image of around 8-bit gradations. A tone map is information representing a correspondence relationship between a gradation value of a base image and a gradation value of an HDR image. An HDR image can be obtained by converting a gradation value of a base image into a gradation value of an HDR image using a tone map.

In addition, HDR image formats include the ACES standard. The ACES standard is a motion picture standard set forth by the Society of Motion Picture and Television Engineers. The ACES standard is a format in which each color of an HDR image is expressed as a 16-bit floating point.

With an HDR image, actual colors and brightness can be faithfully reproduced.

However, displaying an image that faithfully reproduces actual colors and brightness requires a display apparatus (HDR monitor) compatible with an HDR image format. A maximum value of brightness that can be displayed by existing display apparatuses (existing monitors) is around $10^3$ [cd/m$^2$] and is significantly lower than a maximum value of brightness that occurs in nature. For example, the brightness of sunlight is $10^9$ [cd/m$^2$] and is significantly higher than the maximum value of brightness that can be displayed by existing monitors. As described above, a dynamic range in the natural world is wider than a dynamic range of an image that can be displayed by existing monitors. Therefore, in order to display an image that faithfully reproduces actual colors and brightness, higher brightness than existing monitors must be displayed in a high-brightness region of the HDR image using an HDR monitor capable of displaying images with a wider dynamic range than existing monitors.

A display apparatus may sometimes display an image in which a graphic image is combined on a non-combined image. For example, a combined image may be displayed in which a graphic image is combined on an HDR image. For example, a graphic image refers to a graphical user interface (GUI) image of a mouse cursor, a menu, or the like that is generated in accordance with a user operation performed on a display apparatus or a PC. A user operation is, for example, a user operation for editing an HDR image.

However, in conventional art, images with a narrower dynamic range than the dynamic range of HDR images are used as graphic images. Therefore, when a combined image is displayed using an HDR monitor, brightness of a periphery of the graphic image may be inadvertently increased in comparison to the graphic image. As a result, the dazzle of the periphery of the graphic image may cause a decline in visibility of the graphic image.

In addition, as the graphic image, an image with a set transparency may sometimes be used. In other words, a graphic image that enables a transmission of a non-combined image at a set transparency may sometimes be used. Specifically, there is a technique in which a pixel value of a non-combined image and a pixel value of a graphic image are weighted at a set weight and then composited and the weighted and composited value is used as a pixel value of a combined image (Japanese Patent Application Laid-open No. 2003-162275).

However, even when the technique described in Japanese Patent Application Laid-open No. 2003-162275 is used, the brightness of the periphery of a graphic image may end up being higher than the graphic image. As a result, the dazzle of the periphery of the graphic image may cause a decline in visibility of the graphic image.

In addition, when using the technique described in Japanese Patent Application Laid-open No. 2003-162275, since a high-brightness pixel value of an HDR image and a pixel value of a graphic image are weighted and composited, a high-brightness pixel value may be produced as a pixel value after weighted composition. In other words, the brightness of the graphic image may be increased in the combined image. As a result, the dazzle of the graphic image may cause a decline in visibility of the graphic image.

The dazzle that makes an object less visible is referred to as a "glare". The higher the intensity of light irradiating an object, the greater the glare and the greater the decline in visibility of the object. Therefore, the higher the brightness of a graphic image or a periphery thereof, the greater the decline in visibility of the graphic image. In addition, the visibility of an object also varies in accordance with a solid angle between a line of sight of a person and a light source (a light source irradiating the object). For example, the closer the line of sight of a person is to a light-emitting direction of a light source, the greater the glare and the greater the decline in visibility of the object. Therefore, when the brightness of a graphic image or a periphery thereof is high, the decline in visibility of the graphic image increases in comparison to a case where brightness of a distant position from the graphic image is high.

SUMMARY OF THE INVENTION

The present invention provides a technique capable of generating an image with improved visibility of a graphic image as a combined image in which the graphic image is combined on a non-combined image.

The present invention in its first aspect provides an image processing apparatus comprising:

a generating unit configured to generate a combined image in which a graphic image is combined on a non-combined image; and an outputting unit configured to output the combined image, wherein when generating a combined image in which a graphic image with a narrower dynamic range than the non-combined image is combined on the non-combined image, the generating unit generates a combined image in which brightness of at least one region among a region of the graphic image and a region of a periphery thereof is limited to a first threshold or lower.

The present invention in its second aspect provides an image processing method comprising:

generating a combined image in which a graphic image is combined on a non-combined image; and outputting the combined image, wherein when generating a combined image in which a graphic image with a narrower dynamic range than the non-combined image is combined on the non-combined image, a combined image in which brightness of at least one region among a region of the graphic image and a region of a periphery thereof is limited to a first threshold or lower is generated.

The present invention in its third aspect provides a non-transitory computer readable medium that stores a program, wherein the program causes a computer to execute the image processing method.

The present invention in its fourth aspect provides a display apparatus comprising:

a light-emitting unit;

a display unit configured to display an image on a screen by modulating light emitted from the light-emitting unit based on a combined image in which a graphic image is combined on a non-combined image;

a generating unit configured to generate the combined image; and a control unit configured to control emission brightness of the light-emitting unit, wherein when the generating unit generates a combined image in which a graphic image with a narrower dynamic range than the non-combined image is combined on the non-combined image, display brightness of at least one region among a region of the graphic image and a region of a periphery thereof is limited to a threshold or lower by performing at least one of a process in which the generating unit generates a combined image in which brightness is limited, and a process in which the control unit limits the emission brightness of the light-emitting unit.

The present invention in its fifth aspect provides a control method of a display apparatus that includes light-emitting unit, and display unit configured to display an image on a screen by modulating light emitted from the light-emitting unit based on a combined image in which a graphic image is combined on a non-combined image, the control method comprising:

generating the combined image; and controlling emission brightness of the light-emitting unit, wherein when a combined image, in which a graphic image with a narrower dynamic range than the non-combined image is combined on the non-combined image, is generated, display brightness of at least one region among a region of the graphic image and a region of a periphery thereof is limited to a threshold or lower by performing at least one of a process in which a combined image in which brightness is limited is generated, and a process in which the emission brightness of the light-emitting unit is limited.

According to the present invention, an image with improved visibility of a graphic image can be generated as a combined image in which the graphic image is combined on a non-combined image.

Further features of the present invention will become apparent from the following de script ion of exemplary embodiments with reference to the attached drawings.

BRIEF DESCRIPTION OF THE DRAWINGS

FIG. 3 is a diagram showing panel characteristic information according to the first embodiment;

DESCRIPTION OF THE EMBODIMENTS

<First Embodiment>

Hereinafter, an image processing apparatus and an image processing method according to a first embodiment of the present invention will be described.

While an example in which an image processing apparatus is provided in a display apparatus will be described in the present embodiment, the display apparatus and the image processing apparatus may be separate apparatuses.

Figure 1:
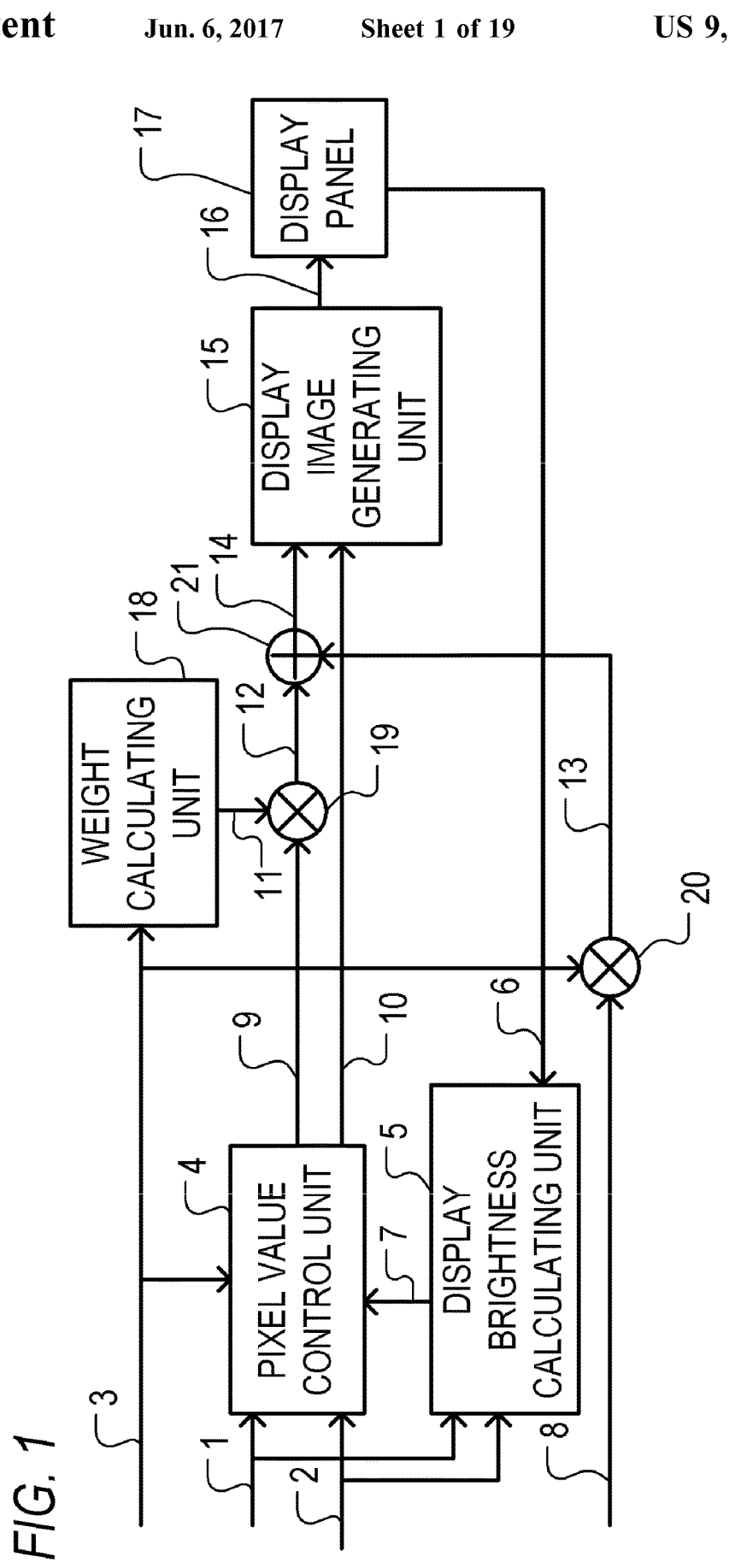
FIG. 1 is a diagram showing a functional configuration of a display apparatus according to a first embodiment.

First, respective functional units of the display apparatus according to the present embodiment will be described with reference to FIG. 1. FIG. 1 is a block diagram showing an example of a functional configuration of a display apparatus according to the present embodiment.

The display apparatus according to the present embodiment generates a display image to be used for display on a display unit (display apparatus). As a display image, the display apparatus according to the present embodiment can generate a combined image in which a graphic image with a dynamic range that is narrower than that of a non-combined image is combined on the non-combined image. For example, a graphic image refers to a graphical user interface (GUI) image of a mouse cursor, a menu, or the like that is generated in accordance with a user operation.

In addition, a base image 1, difference information 2, an alpha value 3, and a graphic image 8 are input to the display apparatus according to the present embodiment.

In the present embodiment, anon-combined image is an image with a high dynamic range (HDR image) and the base image 1 is an image obtained by down-sampling (gradation-compressing) the non-combined image through a bit conversion process. For example, the number of bits in the base image 1 is around 8. The number of bits in the non-combined image need only be larger than the number of bits in the base image 1.

The difference information 2 is information for extending a dynamic range of the base image 1 to generate a non-combined image. In the present embodiment, the difference information 2 is brightness difference data that is used in an extending process for extending the dynamic range of a base image and will be described as data representing a difference between brightness values of an HDR image and a base image. For example, the difference information 2 is brightness ratio data (brightness ratio information) representing a brightness ratio that is a ratio between a brightness value (gradation value) of abase image and a brightness value (gradation value) of an HDR image in pixel units (or units of regions constituted by a predetermined number of pixels). In other words, the difference information 2 is brightness ratio data representing a ratio of a brightness value (gradation value) of an HDR image with respect to a brightness value (gradation value) of a base image or an inverse thereof in pixel units (or units of regions constituted by a predetermined number of pixels). Alternatively, the difference information 2 may be data representing a brightness difference value that is a difference value obtained by subtracting one of a brightness value (gradation value) of a base image and a brightness value (gradation value) of an HDR image from the other in pixel units (or units of regions constituted by a predetermined number of pixels). Alternatively, the difference information 2 may be brightness conversion table data (for example, a tone map to be described in a second embodiment) representing a correspondence relationship between an input brightness value and an output brightness value in an extending process. Moreover, an extending process may also be described as a process for reproducing brightness that is not sufficiently expressed in a base image.

In the present embodiment, the graphic image 8 is an image having a set transparency. The alpha value 3 is a value representing transparency of the graphic image 8. In the present embodiment, the pixel value of the base image 1 and the pixel value of the graphic image 8 are weighted by weights in accordance with the alpha value 3 and then composited. Accordingly, an image in which the graphic image 8 having a set transparency is combined on the base image 1 is obtained. In the present embodiment, the alpha value 3 is set for each pixel position of the base image 1 and weighted composition is performed for each pixel position of the base image 1. In the present embodiment, the alpha value 3 can take a value equal to or larger than zero and equal to or smaller than 1. In addition, by adding up a value obtained by multiplying a pixel value of the base image 1 by an alpha value and a value obtained by multiplying a pixel value of the graphic image by (1−alpha value), a pixel value of an image after weighted composition is calculated. Therefore, when the alpha value 3=1, the pixel value of the base image 1 becomes the pixel value of the image after weighted composition, and when the alpha value 3=0, the pixel value of the graphic image 8 becomes the pixel value of the image after weighted composition.

Subsequently, by extending a dynamic range of the image after weighted composition using the difference information, a combined image is generated. Accordingly, an image in which the graphic image 8 having a set transparency is combined on the non-combined image is obtained as the combined image.

Moreover, the base image 1, the difference information 2, the alpha value 3, and the graphic image 8 may be acquired from an external apparatus or may be recorded in advance in a storage unit provided in a display apparatus according to the present embodiment. The storage unit is a storage medium such as a magnetic disk, an optical disk, and a semiconductor memory. In addition, the alpha value 3 may be set in accordance with a user operation. In other words, the transparency of the graphic image 8 may be can be changed by a user.

Moreover, the alpha value 3 may be set for each region. Alternatively, the alpha value 3 may be set only for pixel positions of the graphic image 8. One common alpha value 3 may be set for all pixel positions in the graphic image 8. As for pixel positions other than the pixel positions in the graphic image 8, a pixel value of the base image 1 may be used as a pixel value of the image after weighted composition without performing a computation for weighted composition.

Moreover, while an example where a combined image is generated by extending a dynamic range of an image in which a graphic image is combined on a base image will be described in the present embodiment, this example is not restrictive. A combined image may be generated by generating a non-combined image by extending the dynamic range of a base image and then performing weighted composition of a pixel value of the non-combined image and a pixel value of a graphic image.

A display image to be used for display on a display panel 17 is generated by a pixel value control unit 4, a display brightness calculating unit 5, a weight calculating unit 18, multipliers 19 and 20, an adder 21, and a display image generating unit 15.

In the present embodiment, when the combined image described above (an image in which a graphic image with a dynamic range that is narrower than that of a non-combined image is combined on the non-combined image) is generated as a display image, a brightness-limited image is generated as the combined image. A brightness-limited image is a combined image in which brightness in a region of the graphic image is limited to a first threshold or lower.

Moreover, a feature of the present invention is a process when generating the combined image described above as a display image. Therefore, hereinafter, a process in a case where the combined image described above is generated as a display image will be described in detail. A description of a process in a case where an image other than the combined image described above is generated as a display image will be omitted.

Moreover, while an example of a case in which the first threshold is a threshold of display brightness (on-screen brightness) in a region of a graphic image will be described in the present embodiment, this example is not restrictive. For example, the first threshold may be a threshold of a brightness value that is represented by a pixel value.

The pixel value control unit 4 limits brightness of the combined image by limiting brightness of the non-combined image. Specifically, the pixel value control unit 4 acquires the base image 1, the difference information (brightness ratio information) 2, and the alpha value 3. In addition, the pixel value control unit 4 acquires display brightness information 7 from the display brightness calculating unit 5. The display brightness information 7 is information representing an estimated value of display brightness of an HDR image resulting from extending a dynamic range of the base image 1 using the brightness ratio information 2. In addition, the pixel value control unit 4 corrects the brightness ratio information 2 based on the alpha value 3 and the display brightness information 7. In the present embodiment, the brightness ratio information 2 is corrected so that a combined image is obtained in which display brightness in a region of the graphic image is limited to a first threshold or lower. Subsequently, the pixel value control unit 4 outputs the base image 1 and corrected brightness ratio information 10. Hereinafter, while a base image output from the pixel value control unit 4 will be described as a "base image 9", the base image 9 and the base image 1 are the same. The corrected brightness ratio information 10 is brightness ratio information after correction.

The pixel value control unit 4 determines that a pixel where the alpha value 3 is larger than zero is a pixel in the region of the graphic image and outputs a value obtained by correcting the brightness ratio information 2 based on the display brightness information 7 as a value of the corrected brightness ratio information 10. In addition, the pixel value control unit 4 determines a pixel where the alpha value 3=0 is not a pixel in the region of the graphic image and outputs the value of the brightness ratio information 2 as the value of the corrected brightness ratio information 10.

Moreover, the first threshold may be a fixed value set in advance by a manufacturer or a value that can be changed by the user.

Moreover, while an example in which a region of a graphic image is determined using the alpha value 3 has been described in the present embodiment, a method of determining the region of a graphic image is not limited thereto. For example, after having the user input region information representing the region of a graphic image, the region of the graphic image may be determined based on the region information. Alternatively, the region of a graphic image may be determined in accordance with a user operation for displaying the graphic image.

The display brightness calculating unit 5 acquires the base image 1 and the brightness ratio information 2. In addition, the display brightness calculating unit 5 acquires the panel characteristic information 6 from the display panel 17. The panel characteristic information 6 is information (a table or a function) representing a correspondence relationship between a brightness value that is expressed by a pixel value and display brightness. In addition, based on the base image 1, the brightness ratio information 2, and the panel characteristic information 6, the display brightness calculating unit 5 calculates display brightness (estimated value) of an HDR image in which the dynamic range of the base image 1 is extended using the brightness ratio information 2. Subsequently, the display brightness calculating unit 5 outputs a calculation result of display brightness as the display brightness information 7.

Moreover, while an example of a case where the display brightness information 7 is information representing display brightness for each pixel position in abase image will be described in the present embodiment, the display brightness information 7 is not limited thereto. The display brightness information 7 may be information representing a representative brightness in a region of a graphic image. Examples of the representative brightness include a maximum value, a minimum value, a mode value, a median value, and an average value of display brightness.

Alternatively, as the panel characteristic information 6, information (a table or a function) representing a correspondence relationship between a pixel value and display brightness may be acquired.

The weight calculating unit 18 calculates a weight of the pixel value of the base image 9. Specifically, the weight calculating unit 18 calculates a weight of the pixel value of the base image 9 by subtracting the alpha value 3 from 1. In addition, the weight calculating unit 18 outputs (1−alpha value) as a base weight 11. In the present embodiment, since the alpha value 3 is set for each pixel position of the base image 9, the base weight 11 is calculated for each pixel position of the base image 9.

The multiplier 19 multiplies the pixel value of the base image 9 by the base weight 11 for each pixel position in the base image 9. In other words, the multiplier 19 multiplies the pixel value of the base image 9 by (1−alpha value) for each pixel position in the base image 9. Subsequently, the multiplier 19 outputs a base image after multiplication by the base weight 11 as a weighted base image 12.

The multiplier 20 multiplies the pixel value of the graphic image 8 by the alpha value 3 for each pixel position in the graphic image 8. In other words, in the present embodiment, the alpha value 3 represents a weight of the pixel value of the graphic image 8. Subsequently, the multiplier 20 outputs a graphic image after multiplication by the alpha value 3 as a weighted graphic image 13.

Moreover, the weighted graphic image 13 may be an image having a pixel value only in the region of the graphic image or an image having a pixel value at each pixel position of the base image 9. Specifically, as the weighted graphic image 13, an image having a pixel value larger than zero in the region of the graphic image and a pixel value of zero in other regions may be generated.

The adder 21 adds the pixel value of the weighted graphic image 13 to the pixel value of the weighted base image 12 for each pixel position in the base image 9. Accordingly, an image in which the graphic image 8 having a set transparency is combined on the base image 1 is obtained as an alpha composite image 14. Subsequently, the adder 21 outputs the alpha composite image 14.

Moreover, for regions other than the region of the graphic image, the pixel value of the weighted base image 12 is output as the pixel value of the alpha composite image 14.

In this manner, according to the present embodiment, the pixel value of the alpha composite image 14 is calculated according to Equation 1 below. In Equation 1, "α" denotes an alpha value, "ES" denotes a pixel value of the base image 9, "GR" denotes a pixel value of the graphic image 8, and "AB" denotes a pixel value of an alpha composite image. In addition, in Equation 1, "α×GR" represents a pixel value of the weighted graphic image 13 and "(1−α)×ES" represents a pixel value of the weighted base image 12. For example, if α=0.5, GR=100, and ES=200, then AB=150.

$$AB = \alpha \times GR + (1-\alpha) \times ES \quad \text{(Equation 1)}$$

The display image generating unit 15 generates a display image 16 by extending a dynamic range of the alpha composite image 14 using the corrected brightness ratio information 10. Specifically, the display image generating unit 15 multiplies a pixel value of the alpha composite image 14 by a value of the corrected brightness ratio information 10 for each pixel of the alpha composite image 14. Accordingly, a pixel value of the display image 16 is calculated. For example, when the pixel value of the alpha composite image 14 is 150 and the value of the corrected brightness ratio information 10 is 1.5, 225 is calculated as the pixel value of the display image 16. By using the corrected brightness ratio information 10, as the display image, a brightness-limited image that is a combined image in which brightness in the region of the graphic image is limited to the first threshold or lower is generated. The display image generating unit 15 outputs the display image 16 to the display panel 17.

The display panel 17 displays the display image 16 on a screen. As the display panel 17, a liquid crystal display panel, a plasma display panel, an organic EL display panel, or the like can be used.

Moreover, when the image processing apparatus according to the present embodiment is a separate apparatus from a display apparatus, the image processing apparatus need not include the display panel 17.

Figure 2:
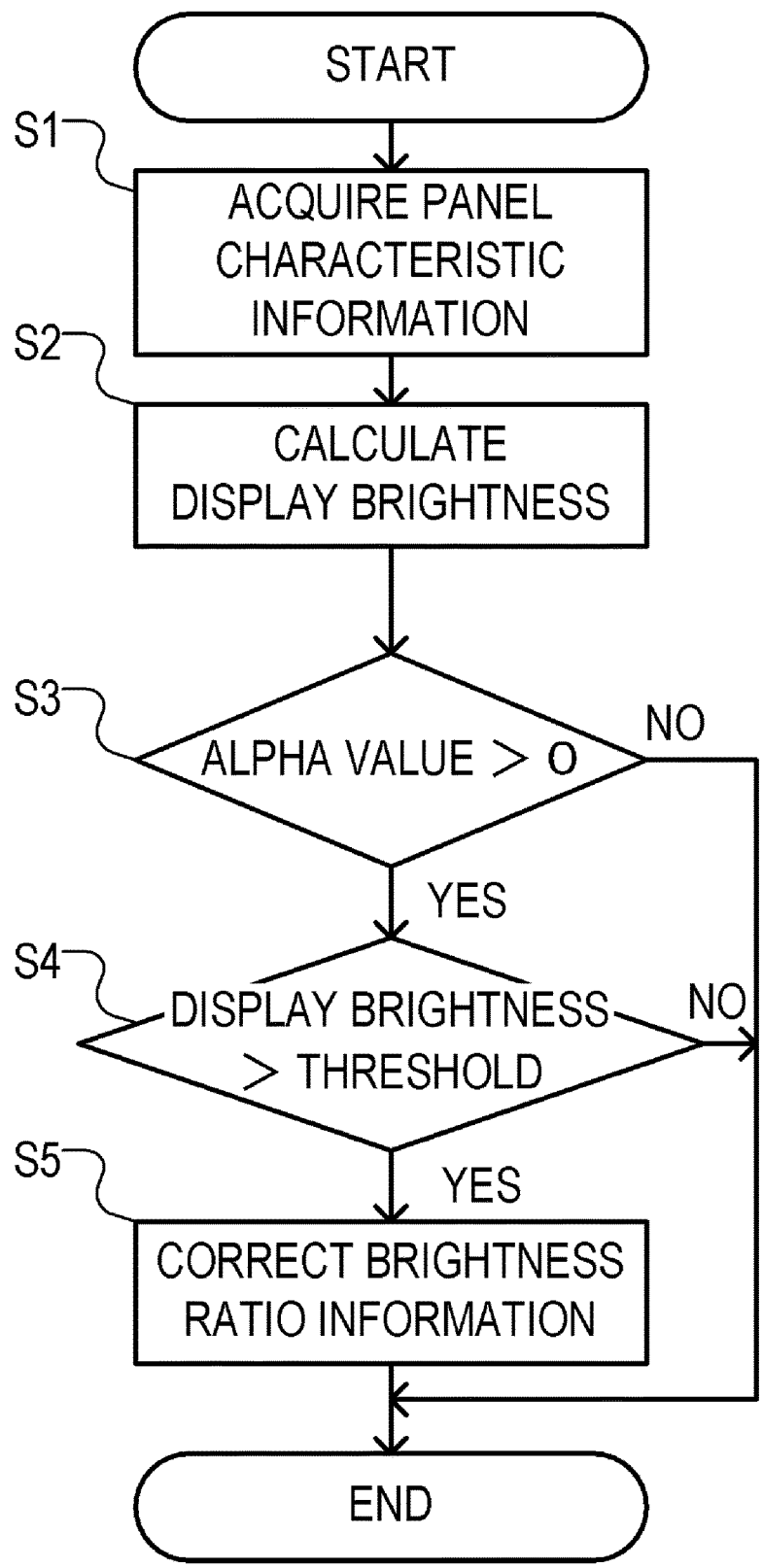
FIG. 2 is a diagram showing a flow of processes of a pixel value control unit and a display brightness calculating unit according to the first embodiment.

Next, processes of the pixel value control unit 4 and the display brightness calculating unit 5 will be described with reference to the flow chart shown in FIG. 2. FIG. 2 is a flow chart showing an example of a flow of processes of the pixel value control unit 4 and the display brightness calculating unit 5.

First, the display brightness calculating unit 5 acquires the panel characteristic information 6 from the display panel 17 (S1).

Next, using the base image 1, the brightness ratio information 2, and the panel characteristic information 6, the display brightness calculating unit 5 calculates display brightness of an HDR image in which the dynamic range of the base image 1 is extended using the brightness ratio information 2 (S2). The display brightness is calculated for each pixel in the base image 1. The display brightness calculating unit 5 outputs a display brightness calculation result to the pixel value control unit 4 as the display brightness information 7.

In the present embodiment, based on the base image 1 and the brightness ratio information 2, the display brightness calculating unit 5 calculates a pixel value of an HDR image in which the dynamic range of the base image 1 is extended using the brightness ratio information 2. Subsequently, from the pixel value of the HDR image, the display brightness calculating unit 5 calculates a brightness value represented by the pixel value. In the present embodiment, a pixel value of an HDR image is an RGB value and a brightness value is calculated using Equation 2 below. In Equation 2, "R" denotes an R value (gradation value of red) among the pixel value of the HDR image, "G" denotes a G value (gradation value of green) among the pixel value of the HDR image, and "B" denotes a B value (gradation value of blue) among the pixel value of the HDR image. In addition, "Y" denotes a brightness value represented by the pixel value of the HDR image.

$$Y=0.2126\times R+0.7152\times G+0.0722\times B \qquad \text{(Equation 2)}$$

In addition, in the present embodiment, the display brightness calculating unit 5 acquires a table shown in FIG. 3 as the panel characteristic information 6. The table shown in FIG. 3 presents display brightness for each brightness value. Subsequently, the display brightness calculating unit 5 acquires display brightness corresponding to the calculated brightness value from the table shown in FIG. 3 and outputs the acquired display brightness to the pixel value control unit 4 as the display brightness information 7. For example, for a pixel where R=100, G=100, and B=100, Y=100 is calculated. Therefore, 40 [cd/m$^2$] is acquired as the display brightness of such a pixel.

Moreover, a table indicating display brightness may be acquired as the panel characteristic information 6 for all brightness values or a table indicating display brightness may be acquired as the panel characteristic information 6 for a part of brightness values. When the display brightness corresponding to the calculated brightness value is not described in the table (panel characteristic information 6), the display brightness corresponding to the calculated brightness value may be calculated by an interpolating process using display brightness described in the table.

Subsequently, the pixel value control unit 4 determines whether or not the alpha value 3 is larger than zero for each pixel position in the base image 1 (S3). The pixel value control unit 4 determines that a pixel position at which the alpha value 3 is larger than zero is a position in the region of the graphic image (a graphic combined position) and performs the process of S4. In addition, the pixel value control unit 4 determines that a pixel position at which the alpha value 3 is zero is a position outside the region of the graphic image (a graphic non-combined position). Subsequently, with respect to a graphic non-combined position, the pixel value control unit 4 outputs a same value as the value of the brightness ratio information 2 to the display image generating unit 15 as the value of the corrected brightness ratio information 10 of the graphic non-combined position without performing the process of S4.

In S4, for each graphic combined position, the pixel value control unit 4 determines whether or not the display brightness calculated in S2 is higher than a threshold (brightness threshold). The pixel value control unit 4 determines that a graphic combined position at which the display brightness calculated in S2 is higher than the brightness threshold is a high-brightness region at which display brightness of a combined image is likely to exceed a first threshold and performs the process of S5. In addition, the pixel value control unit 4 determines that a graphic combined position at which the display brightness calculated in S2 is equal to the brightness threshold or lower is a low-brightness position at which display brightness of a combined image is unlikely to exceed the first threshold. Subsequently, with respect to a low-brightness position, the pixel value control unit 4 outputs a same value as the value of the brightness ratio information 2 to the display image generating unit 15 as the value of the corrected brightness ratio information 10 of the low-brightness position without performing the process of S5.

The brightness threshold is, for example, brightness that the user feels dazzling. In the present embodiment, a maximum value of brightness that is displayable by an existing display apparatus (existing monitor) is used as the brightness threshold.

Specifically, maximum brightness of 100 [cd/m$^2$] as defined in BT709 is used as the brightness threshold. However, the brightness threshold is not limited to this value. The brightness threshold may be a fixed value set by a manufacturer or a value that can be changed by the user. Alternatively, the brightness threshold may be determined in accordance with a visual environment (installation environment of a display apparatus) or the like. The brightness threshold may have a same value as the first threshold or may be a different value.

In S5, the pixel value control unit 4 acquires a value of the corrected brightness ratio information 10 by correcting the value of the brightness ratio information 2 for each high-brightness position. Specifically, the value of the corrected brightness ratio information 10 is calculated from the value of the brightness ratio information 2 so that display brightness of a high-brightness position in an HDR image in which a dynamic range of the base image 1 has been extended using the corrected brightness ratio information 10 is equal to the brightness threshold or lower. In the present embodiment, the value of the corrected brightness ratio information 10 is calculated using Equation 3 below. In Equation 3, "HRatio" denotes a value of the corrected brightness ratio information 10, "Ratio" denotes a value of the brightness ratio information 2, "C" denotes the brightness threshold, and "K" denotes the display brightness calculated in S2. By using the value of the corrected brightness ratio information 10 calculated as described above, a brightness-limited image that is a combined image in which brightness in the region of the graphic image is limited to the first threshold or lower can be generated.

$$HRatio = Ratio \times C/K \quad \text{(Equation 3)}$$

Subsequently, the pixel value control unit 4 outputs the corrected brightness ratio information 10 (the value of the corrected brightness ratio information 10 at each pixel position) to the display image generating unit 15.

Next, a specific example of image processing according to the first embodiment will be described with reference to FIGS. 4A to 4E.

Figure 4A:
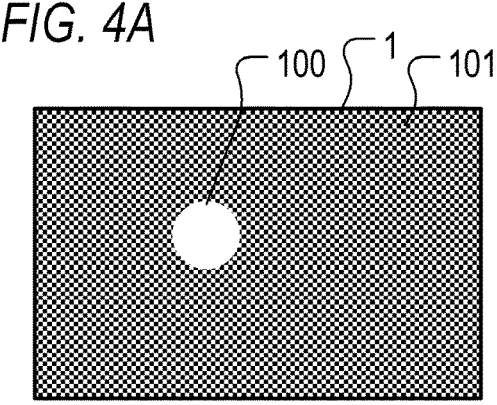
FIGS. 4A to 4E are diagrams showing image processing according to the first embodiment.

FIG. 4A shows an example of the base image 1. In the example shown in FIG. 4A, the base image 1 has a high-brightness image section 100 and a low-brightness image section 101. The high-brightness image section 100 is a region in an HDR image resulting from extending a dynamic range of the base image 1 using the brightness ratio information 2 in which display brightness is higher than the brightness threshold. The low-brightness image section 101 is a region in an HDR image resulting from extending a dynamic range of the base image 1 using the brightness ratio information 2 in which display brightness is equal to the brightness threshold or lower. In FIG. 4A, brightness values are expressed by colors such that the higher the brightness value, the closer the color is to white.

Figure 4D:
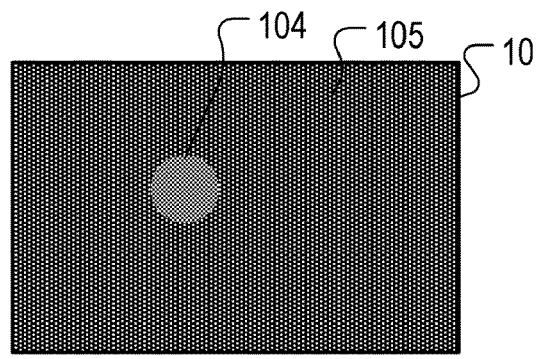
Figure 4B:
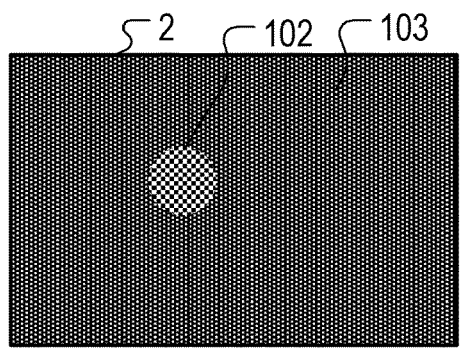

FIG. 4B shows an example of the brightness ratio information 2. In the example shown in FIG. 4B, the brightness ratio information 2 has a high-brightness ratio section 102 and a low-brightness ratio section 103. The high-brightness ratio section 102 indicates a brightness ratio at each pixel position in the high-brightness image section 100. The low-brightness ratio section 103 indicates a brightness ratio at each pixel position in the low-brightness image section 101. In FIG. 4B, brightness ratios are expressed by colors such that the higher the brightness ratio, the closer the color is to white.

Figure 4E:
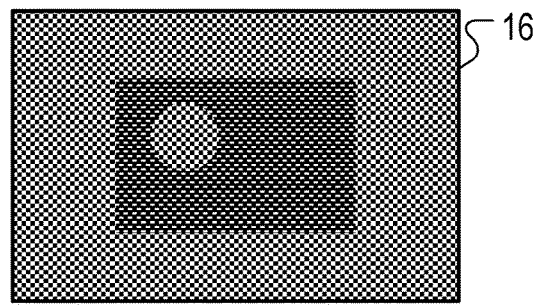
Figure 4C:

FIG. 4C shows an example of the graphic image 8. As described earlier, the number of bits in the graphic image 8 is smaller than the number of bits in an HDR image. In the present embodiment, it is assumed that the number of bits in a graphic image is around 8. The alpha composite image 14 is generated by performing weighted composition (alpha composition) on a pixel value of the graphic image 8 and a pixel value of the base image 1. In FIG. 4C, brightness values are expressed by colors such that the higher the brightness value, the closer the color is to white.

FIG. 4D shows an example of the corrected brightness ratio information 10. In the example shown in FIG. 4D, the corrected brightness ratio information 10 has a high-brightness ratio section 104 and a low-brightness ratio section 105. The high-brightness ratio section 104 indicates a brightness ratio at each pixel position in the high-brightness image section 100. The low-brightness ratio section 105 indicates a brightness ratio at each pixel position in the low-brightness image section 101. In FIG. 4D, brightness ratios are expressed by colors such that the higher the brightness ratio, the closer the color is to white. FIGS. 4B and 4D show that a lower value than the brightness ratio indicated by the high-brightness ratio section 102 is obtained as the brightness ratio indicated by the high-brightness ratio section 104. Specifically, the high-brightness ratio section 104 is obtained indicating a brightness ratio such that display brightness of the high-brightness image section 100 in an HDR image resulting from extending a dynamic range of the base image 1 using the corrected brightness ratio information 10 is equal to the brightness threshold or lower. In addition, FIGS. 4B and 4D show that a same value as the brightness ratio indicated by the low-brightness ratio section 103 is obtained as the brightness ratio indicated by the low-brightness ratio section 105. This is due to the fact that display brightness of the low-brightness image section 101 in an HDR image resulting from extending a dynamic range of the base image 1 using the low-brightness ratio section 103 is kept equal to the brightness threshold or lower.

FIG. 4E shows an example of the display image 16. The display image 16 shown in FIG. 4E is a brightness-limited image in which a dynamic range of an alpha composite image obtained by combining the graphic image shown in FIG. 4C on the base image 1 shown in FIG. 4A is extended using the corrected brightness ratio information 10 shown in FIG. 4D. FIG. 4E shows that brightness of the region of the graphic image is prevented from rising excessively. Specifically, the brightness of the region of the graphic image is limited to the first threshold or lower. More specifically, brightness of the high-brightness image section 100 is limited to the first threshold or lower.

Hereinafter, an example of a case where the high-brightness image section 100 of the base image 1 has a pixel value of R=400, G=400, and B=400 will be described. Moreover, in the following description, it is assumed that the brightness threshold is 100 [cd/m$^2$] and that a brightness ratio indicated by the high-brightness ratio section 102 is 100.

Based on a pixel value in the high-brightness image section 100 of the base image 1 and a brightness ratio indicated by the high-brightness ratio section 102, the display brightness calculating unit 5 calculates a pixel value of R=40000, G=40000, and B=40000. Specifically, the pixel value described above is calculated as a pixel value in the high-brightness image section 100 in an HDR image resulting from extending a dynamic range of the base image 1 using the brightness ratio information 2. In the table shown in FIG. 3, display brightness corresponding to the brightness value calculated using Equation 2 from the pixel value of R=40000, G=40000, and B=40000 is 1000 [cd/m$^2$] which is higher than the brightness threshold 100 [cd/m$^2$]. Therefore, a brightness ratio indicated by the high-brightness ratio section 102 is corrected by the pixel value control unit 4 so that display brightness of the high-brightness image section 100 in an HDR image resulting from extending a dynamic range of the base image 1 using the corrected brightness ratio information 10 is equal to the brightness threshold or lower. Accordingly, the high-brightness ratio section 104 is obtained. Specifically, 0.1 is calculated by a computation using Equation 3 as a brightness ratio indicated by the high-brightness ratio section 104. The display brightness in the low-brightness image section 101 of the HDR image resulting from extending a dynamic range of the base image 1 using the brightness ratio information 2 is equal to the brightness threshold or lower. Therefore, the brightness ratio indicated by the low-brightness ratio section 103 is used as the brightness ratio indicated by the low-brightness ratio section 105 without being corrected.

By using the corrected brightness ratio information 10 acquired in this manner, as shown in FIG. 4E, the display brightness of the high-brightness image section 100 can be reduced to the first threshold or lower and dazzle of the graphic image can be suppressed. For example, lightness of a graphic image can be prevented from rising excessively when the graphic image is combined on a bright region of the sun. As a result, a situation where excessive brightness of a graphic image makes the graphic image less visible can be avoided.

As described above, according to the present embodiment, when generating a combined image as a display image, a brightness-limited image that is a combined image in which brightness in a region of a graphic image is limited to a first threshold or lower is generated. Accordingly, a combined image (brightness-limited image) with improved visibility of the graphic image can be generated as the display image. Specifically, a situation where excessive brightness of a graphic image makes the graphic image less visible can be avoided. Accordingly, operation efficiency of the user can be improved.

Moreover, while an example in which an alpha composite image is generated by performing alpha composition on a base image and a graphic image and a brightness-limited image is generated by extending a dynamic range of the alpha composite image using difference information after correction has been described in the present embodiment, this example is not restrictive. Alternatively, an HDR image may be generated by extending a dynamic range of a based image using difference information after correction and a brightness-limited image may be generated by performing alpha composition on the HDR image and a graphic image.

Moreover, while an example in which brightness of a combined image is limited by correcting difference information has been described in the present embodiment, this example is not restrictive. For example, the brightness of a combined image may be limited by correcting transparency (for example, an alpha value) of a graphic image. Alternatively, the brightness of a combined image may be limited by correcting a base image. Alternatively, the brightness of a combined image may be limited by correcting an image in which a graphic image is combined on a base image. A brightness-limited image may be generated by limiting brightness of a combined image in which a graphic image is combined on an HDR image.

Moreover, the image processing apparatus may further include an image determining unit that determines whether or not a non-combined image is an HDR image. In addition, a brightness-limited image may be generated when the non-combined image is determined to be an HDR image and a combined image is to be generated as a display image. In other words, a process for limiting brightness of a combined image may be performed when the non-combined image is determined to be an HDR image and the combined image is to be generated as a display image. In other cases, a display image may be generated without performing a process for limiting brightness of a combined image.

The image determining unit determines, for example, whether or not the number of bits in a non-combined image is equal to or larger than 8. The non-combined image is determined to be an HDR image when the number of bits in the non-combined image is equal to or larger than 8, and the non-combined image is determined not to be an HDR image when the number of bits in the non-combined image is smaller than 8.

Moreover, a method of determining whether or not a non-combined image is an HDR image is not limited to the method described above.

For example, a determination may be made on whether or not a data format of the non-combined image is a floating point format. In addition, the non-combined image may be determined to be an HDR image when the data format of the non-combined image is a floating point format, and the non-combined image may be determined not to be an HDR image when the data format of the non-combined image is not a floating point format.

Alternatively, a determination may be made on whether or not the data format of the non-combined image is an OpenEXR format. Subsequently, the non-combined image may be determined to be an HDR image when the data format of the non-combined image is the OpenEXR format, and the non-combined image may be determined not to be an HDR image when the data format of the non-combined image is not the OpenEXR format.

Alternatively, a determination may be made on whether or not a base image and difference information have been input to the image processing apparatus. Subsequently, the non-combined image may be determined to be an HDR image when abase image and difference information have been input to the image processing apparatus, and the non-combined image may be determined not to be an HDR image when a base image and difference information have not been input to the image processing apparatus.

Moreover, while display brightness of a non-combined image is estimated in the present embodiment, display brightness of a combined image may be estimated instead. Subsequently, brightness ratio information may be corrected based on the display brightness of the combined image.

Figure 19:
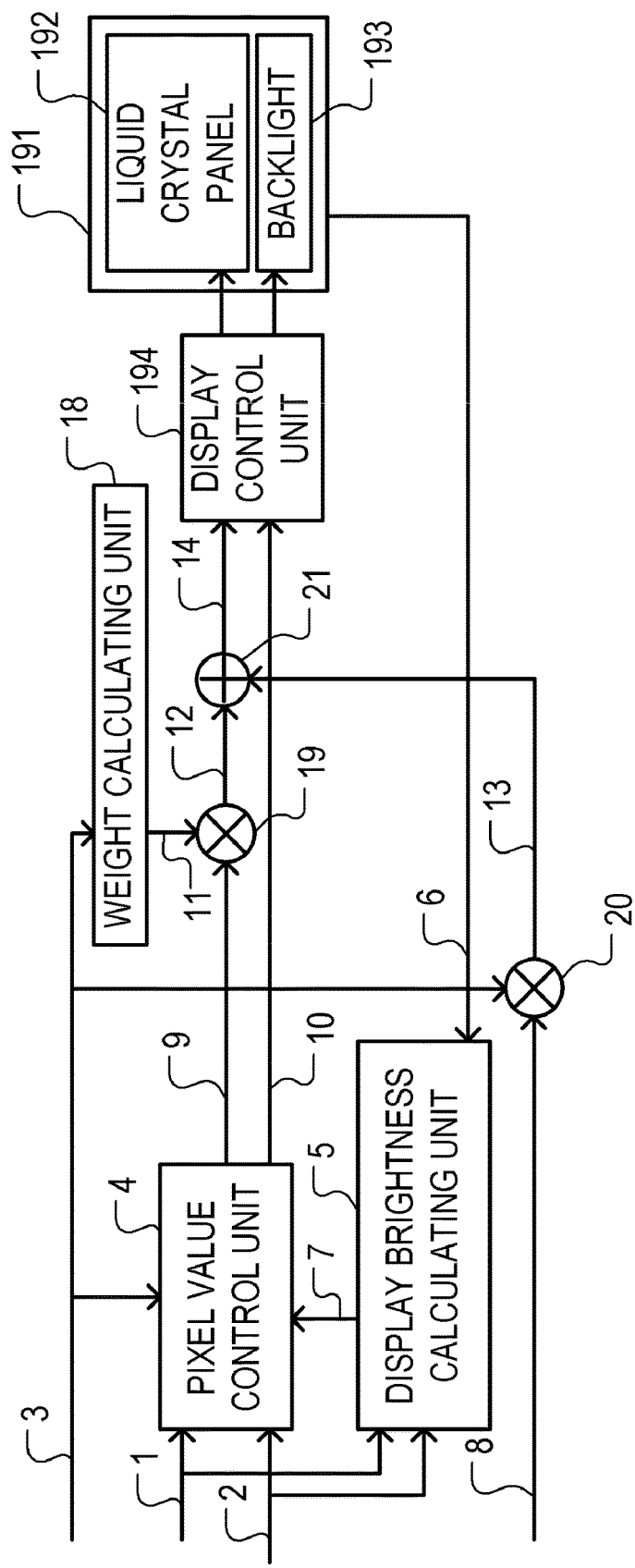
FIG. 19 is a diagram showing a functional configuration of a display apparatus according to the first embodiment.

Moreover, while an example in which a brightness-limited image is generated as a display image has been described in the present embodiment, this example is not restrictive. For example, the display apparatus according to the present embodiment may be configured as shown in FIG. 19. In FIG. 19, same functional units as in FIG. 1 are assigned same reference characters and descriptions thereof are omitted.

A display unit 191 includes a liquid crystal panel 192 and a backlight 193.

The backlight 193 is a light-emitting unit that irradiates light on a rear surface of the liquid crystal panel 192.

The liquid crystal panel 192 displays an image on a screen by transmitting light from the backlight 193 at a transmittance based on the display image.

Moreover, the backlight 193 may or may not be configured so that emission brightness can be changed for each region.

A display control unit 194 includes a function for generating a display image and a function for controlling emission brightness of the backlight 193.

Alternatively, a process of generating a display image and a process of controlling emission brightness of the backlight 193 may be executed by functional units that differ from each other.

In the case of a display apparatus configured as described above, display brightness can also be changed by changing the emission brightness of the backlight 193. Therefore, at least one of a process of generating a brightness-limited image as a display image and a process of controlling emission brightness of the backlight 193 may be performed when generating a combined image as the display image. For example, the display image may be generated using the alpha composite image 14 and the brightness ratio information 2 and the emission brightness of the backlight 193 may be controlled using the corrected brightness ratio information 10. Accordingly, display brightness of at least one of a region of the graphic image and a region of a periphery thereof can be limited to a threshold or lower.

Moreover, while an example of a transmissive liquid crystal display apparatus is shown in FIG. 19, the display apparatus according to the present embodiment is not limited thereto. The display apparatus according to the present embodiment need only be a display apparatus that displays an image on a screen by modulating light from a light-emitting unit. For example, the display apparatus according to the present embodiment may be a reflective liquid crystal display apparatus. In addition, the display apparatus according to the present embodiment may be a micro electro mechanical system (MEMS) shutter system display which uses a MEMS shutter instead of liquid crystal elements.

<Second Embodiment>

Hereinafter, an image processing apparatus and an image processing method according to a second embodiment of the present invention will be described.

In the first embodiment, an example of a case in which brightness ratio information is difference information has been described. In the present embodiment, an example of a case in which a tone map is difference information will be described. A tone map is information (a table or a function) representing a correspondence relationship between a gradation value before extending a dynamic range and a gradation value after extending the dynamic range. Since a tone map that is difference information may be obtained by interchanging an input value and an output value of a tone map used in a conversion process for converting an HDR image (non-combined image) into a base image, a tone map that is difference information may also be called an inverse tone map.

Figure 5:
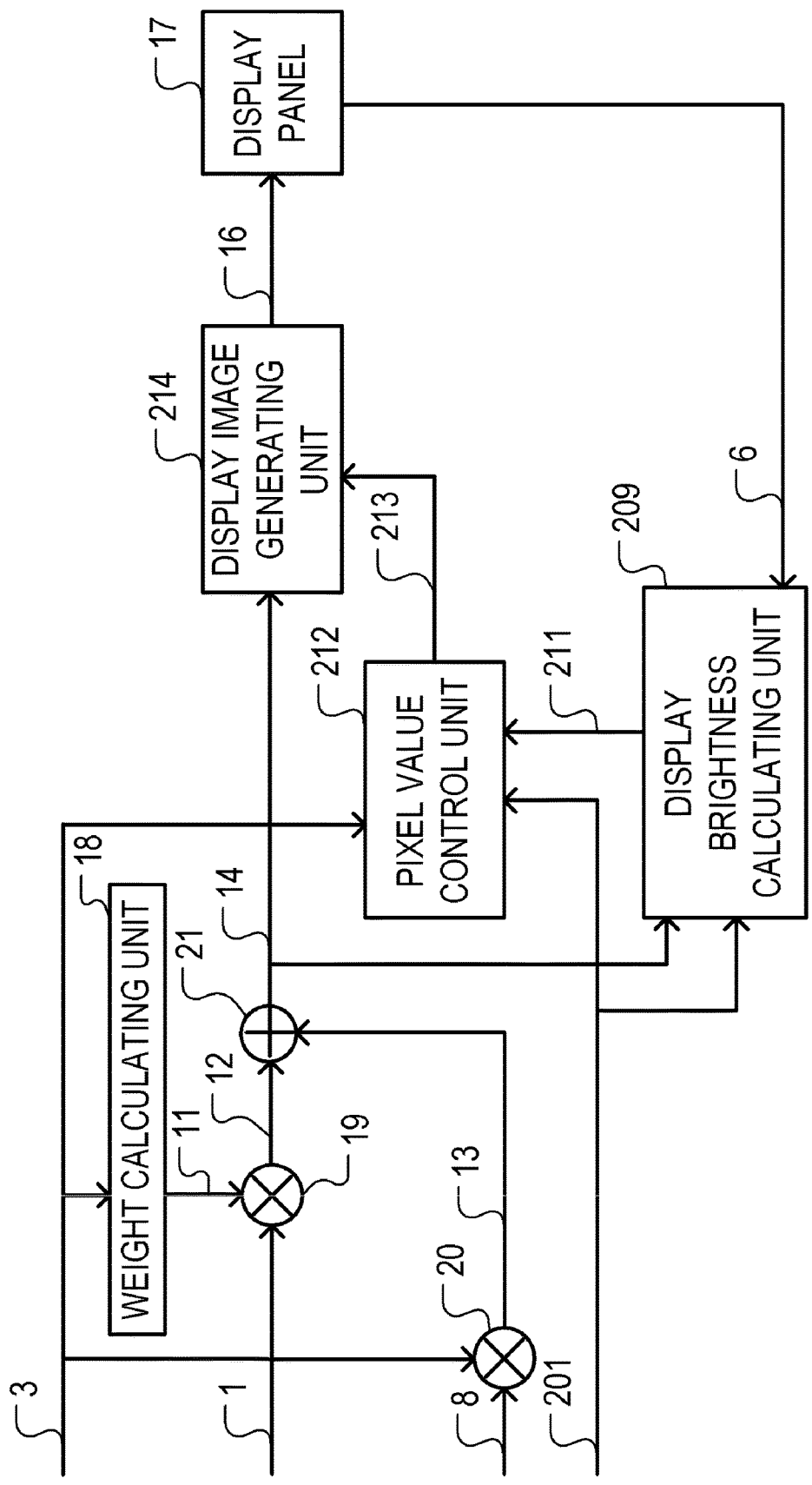
FIG. 5 is a diagram showing a functional configuration of a display apparatus according to a second embodiment.

First, respective functional units of the display apparatus according to the present embodiment will be described with reference to FIG. 5.

Moreover, same functional units as in the first embodiment are assigned same reference characters and descriptions thereof are omitted.

A base image 1, an inverse tone map 201, an alpha value 3, and a graphic image 8 are input to the display apparatus according to the present embodiment.

As described above, the inverse tone map 201 is information (a table or a function) representing a correspondence relationship between a gradation value before extending a dynamic range and a gradation value after extending the dynamic range. By converting a gradation value of the base image 1 using the inverse tone map 201, a dynamic range of the base image 1 can be extended and the base image 1 can be converted into an HDR image (non-combined image).

Moreover, the inverse tone map 201 may be information prepared for each image content, information prepared for each frame, or information prepared for each scene.

In addition, one inverse tone map 201 that is shared among pixels may be input or an inverse tone map 201 for each pixel may be input. Alternatively, an inverse tone map 201 for each region may be input.

In the present embodiment, a weight calculating unit 18, multipliers 19 and 20, and an adder 21 are used to perform alpha composition in a similar manner to the first embodiment. However, the present embodiment slightly differs from the first embodiment in a process involving the multiplier 19. Specifically, the multiplier 19 according to the first embodiment calculates a pixel value of a weighted base image 12 by multiplying a pixel value of a base image 9 output from a pixel value control unit 4 by a base weight 11. The multiplier 19 according to the present embodiment calculates a pixel value of the weighted base image 12 by multiplying a pixel value of a base image 1 input to the display apparatus by the base weight 11.

A display brightness calculating unit 209 acquires the alpha composite image 14 and the inverse tone map 201. In addition, the display brightness calculating unit 209 acquires the panel characteristic information 6 from a display panel 17. Subsequently, based on the alpha composite image 14, the inverse tone map 201, and the panel characteristic information 6, the display brightness calculating unit 209 calculates display brightness (estimated value) of an HDR image in which the dynamic range of the alpha composite image 14 is extended using the inverse tone map 201. The HDR image in which the dynamic range of the alpha composite image 14 is extended using the inverse tone map 201 is a combined image in which the graphic image 8 is combined on a non-combined image that is an HDR image. Subsequently, the display brightness calculating unit 209 outputs a calculation result of display brightness as display brightness information 211.

A pixel value control unit 212 acquires the alpha value 3, the inverse tone map 201, and the display brightness information 211. In addition, the pixel value control unit 212 corrects the inverse tone map 201 based on the alpha value 3 and the display brightness information 211. In the present embodiment, the inverse tone map 201 is corrected so that a combined image in which display brightness in a region of a graphic image is limited to a first threshold or lower is obtained in a similar manner to the first embodiment. Subsequently, the pixel value control unit 212 outputs the inverse tone map after correction as a corrected inverse tone map 213. In the present embodiment, a plurality of inverse tone maps are prepared in advance and one of the plurality of inverse tone maps is selected as the corrected inverse tone map 213. For example, an inverse tone map capable of reducing display brightness (display brightness as calculated by the display brightness calculating unit 209) in the region of the graphic image to the brightness threshold or lower is selected as the corrected inverse tone map 213.

The pixel value control unit 212 determines that a pixel where the alpha value 3 is larger than zero is a pixel in the region of the graphic image and outputs an inverse tone map obtained by correcting the inverse tone map 201 based on the display brightness information 211 as the corrected inverse tone map 213. In addition, the pixel value control unit 4 determines a pixel where the alpha value 3=0 is not a pixel in the region of the graphic image and outputs the inverse tone map 201 as the corrected inverse tone map 213.

Moreover, while an example in which one of a plurality of inverse tone maps is selected as the corrected inverse tone map 213 will be described in the present embodiment, the corrected inverse tone map 213 may be generated by adjusting a value of the inverse tone map 201.

In addition, while an example in which the corrected inverse tone map 213 is generated for each pixel will be described in the present embodiment, one corrected inverse tone map 213 that is shared among pixels may be generated instead.

A display image generating unit 214 generates a display image 16 by extending a dynamic range of the alpha composite image 14 using the corrected inverse tone map 213. Specifically, the display image generating unit 214 converts a pixel value of the alpha composite image 14 using the corrected inverse tone map 213 for each pixel of the alpha composite image 14. Accordingly, a pixel value of the display image 16 is obtained. By using the corrected inverse tone map 213, a brightness-limited image that is a combined image in which brightness in the region of the graphic image is limited to the first threshold or lower is generated as the display image. The display image generating unit 214 outputs the display image 16 to the display panel 17.

Figure 6:
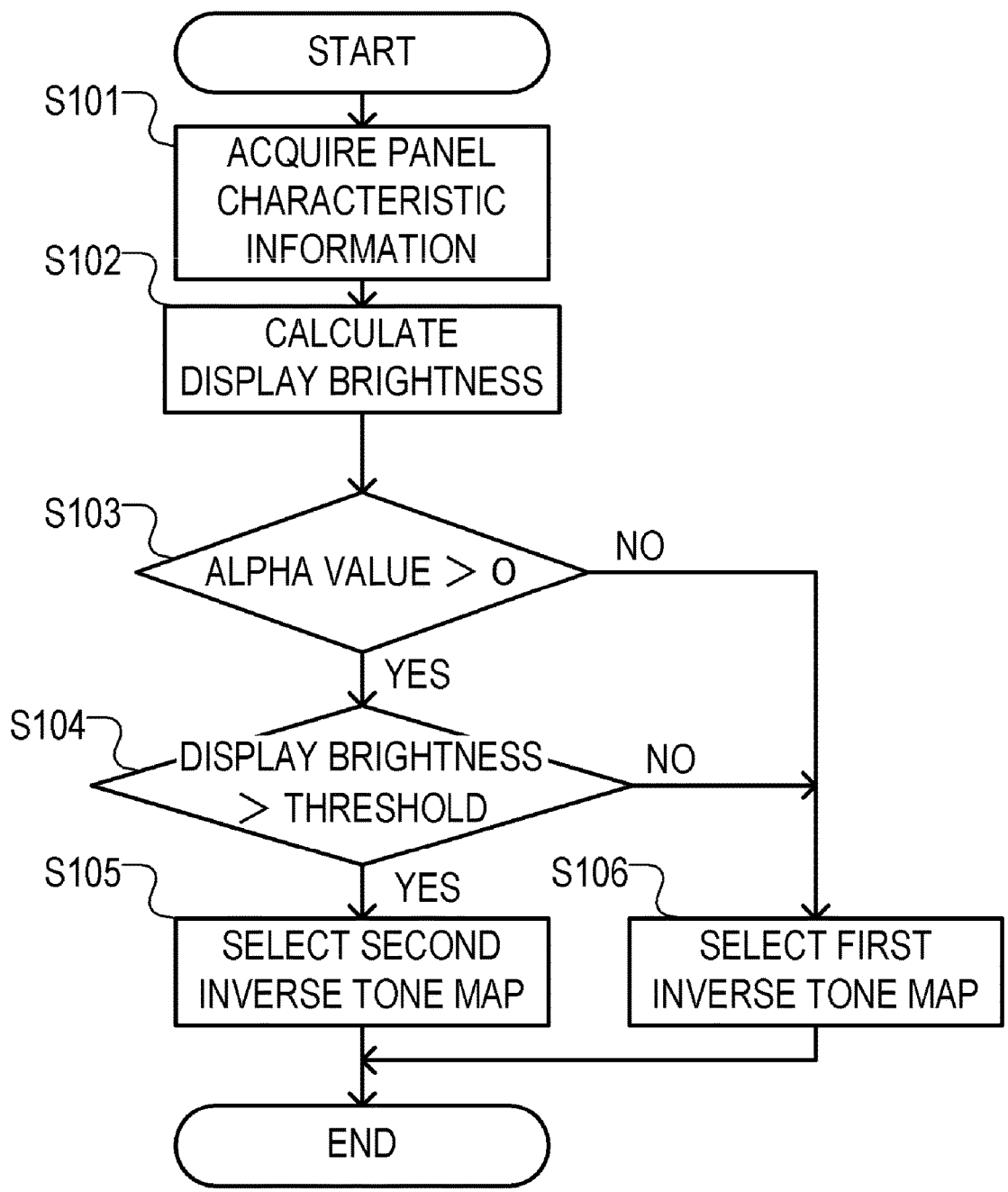
FIG. 6 is a diagram showing a flow of processes of a pixel value control unit and a display brightness calculating unit according to the second embodiment.

Next, processes of the display brightness calculating unit 209 and the pixel value control unit 212 will be described with reference to the flow chart shown in FIG. 6. FIG. 6 is a flow chart showing an example of a flow of processes of the display brightness calculating unit 209 and the pixel value control unit 212.

First, the display brightness calculating unit 209 acquires the panel characteristic information 6 from the display panel 17 (S101).

Next, using the alpha composite image 208, the inverse tone map 201, and the panel characteristic information 6, the display brightness calculating unit 209 calculates display brightness of an HDR image in which the dynamic range of the alpha composite image 208 is extended using the inverse tone map 201 (S102). In the present embodiment, a pixel value of the HDR image is calculated, a brightness value is calculated from the calculated pixel value, and display brightness corresponding to the calculated brightness value is acquired in a similar manner to the first embodiment.

Subsequently, the pixel value control unit 212 determines whether or not the alpha value 3 is larger than zero for each pixel position in the base image 1 (S103). The pixel value control unit 212 determines that a pixel position at which the alpha value 3 is larger than zero is a graphic combined position and performs the process of S104. In addition, the pixel value control unit 212 determines that a pixel position at which the alpha value 3 is zero is a graphic non-combined position and performs the process of S106.

In S104, for each graphic combined position, the pixel value control unit 212 determines whether or not the display brightness calculated in S102 is higher than a brightness threshold. The pixel value control unit 212 determines that a graphic combined position at which the display brightness calculated in S102 is higher than the brightness threshold is a high-brightness region at which display brightness of a combined image exceeds a first threshold and performs the process of S105. In addition, the pixel value control unit 212 determines that a graphic combined position at which the display brightness calculated in S102 is equal to or lower than the brightness threshold is a low-brightness region at which display brightness of a combined image does not exceed a first threshold and performs the process of S106.

In S105, the pixel value control unit 212 acquires the corrected inverse tone map 213 by correcting the inverse tone map 201 for each high-brightness position. Specifically, a second inverse tone map is selected as the corrected inverse tone map 213 of a high-brightness position. Subsequently, the pixel value control unit 212 outputs the selected corrected inverse tone map 213 to the display image generating unit 214.

In S106, the pixel value control unit 212 selects the inverse tone map 201 (a first inverse tone map) as the corrected inverse tone map 213 for a low-brightness position and a graphic non-combined position. In addition, the corrected inverse tone map 213 is output to the display image generating unit 15. Subsequently, the pixel value control unit 212 outputs the selected corrected inverse tone map 213 to the display image generating unit 214.

Next, a specific example of an inverse tone map will be described with reference to FIGS. 7A and 7B.

Figure 7A:
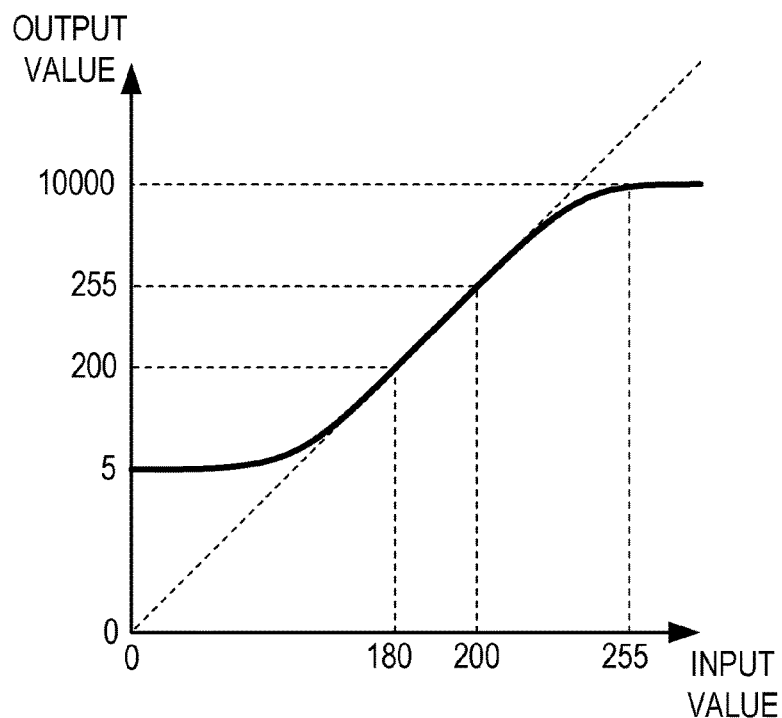
FIGS. 7A and 7B are diagrams showing an inverse tone map according to the second embodiment.
Figure 7B:
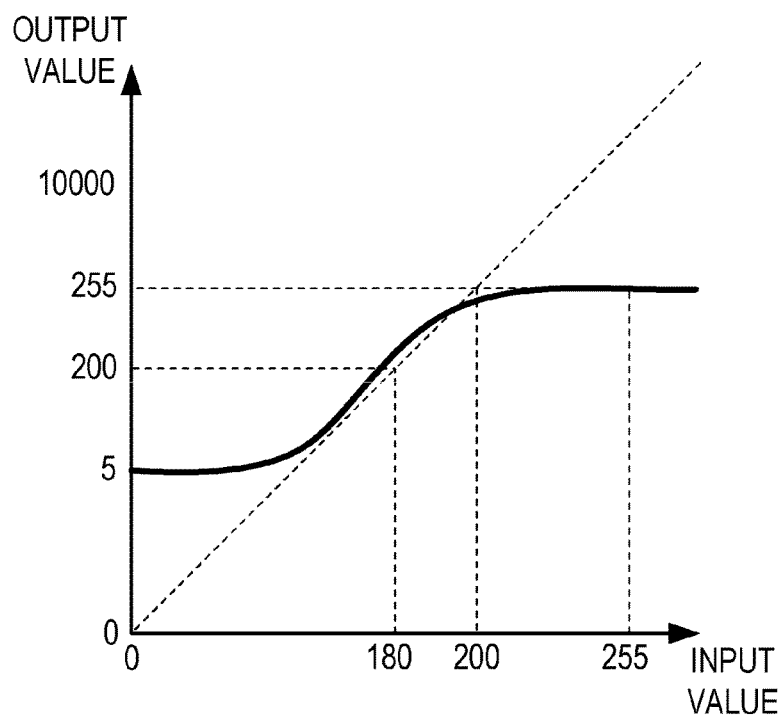

FIG. 7A shows an example of a first inverse tone map and FIG. 7B shows an example of a second inverse tone map. In FIGS. 7A and 7B, abscissa axes represent gradation values before extending a dynamic range and ordinate axes represent gradation values after extending the dynamic range. Hereinafter, a gradation value on the abscissa axis will be described as an "input value" and a gradation value on the ordinate axis will be described as an "output value".

In the present embodiment, the first inverse tone map is used on low-brightness positions and graphic non-combined positions. In addition, the second inverse tone map is used on high-brightness positions.

FIGS. 7A and 7B show that a range of output values assigned with respect to a range of input values is narrower in the second inverse tone map than in the first inverse tone map. Specifically, while output values of 5 to 1000 are assigned to an input value range of 0 to 255 in the first inverse tone map, output value s of 5 to 255 are assigned to an input value range of 0 to 255 in the second inverse tone map. In other words, in the second inverse tone map, a maximum value of output values is limited to 255.

By using such a second inverse tone map, a graphic image can be prevented from being dazzling.

As described above, according to the present embodiment, when generating a combined image as a display image, an inverse tone map is corrected and a brightness-limited image that is a combined image in which brightness in a region of a graphic image is limited to a first threshold or lower is generated. Accordingly, a combined image (brightness-limited image) with improved visibility of the graphic image can be generated as the display image. Specifically, a situation where excessive brightness of a graphic image makes the graphic image less visible can be avoided.

Moreover, while display brightness of a combined image is estimated in the present embodiment, display brightness of anon-combined image may be estimated instead in a similar manner to the first embodiment. Subsequently, an inverse tone map may be corrected based on the display brightness of the non-combined image.

<Third Embodiment>

Hereinafter, an image processing apparatus and an image processing method according to a third embodiment of the present invention will be described.

While examples of a case in which a still image is displayed by a display apparatus has been described in the first and second embodiments, an example of a case in which a moving image is displayed by a display apparatus will be described in the present embodiment.

First, respective functional units of the display apparatus according to the present embodiment will be described. A configuration of the display apparatus according to the present embodiment is the same as in the first embodiment (FIG. 1). However, in the present embodiment, a display image is generated for each frame in order to display a moving image.

A base image 1, brightness ratio information 2, and a graphic image 8 are input for each frame to the display apparatus according to the present embodiment. In the present embodiment, a frame rate of a moving image is assumed to be 60 fps. Therefore, in the present embodiment, 60 base images 1, 60 pieces of brightness ratio information 2, and 60 graphic images 8 are sequentially input every second.

A display brightness calculating unit 5 calculates display brightness for each frame (for each image). For example, display brightness is calculated for 60 images every second. A method of calculating the display brightness is the same as in the first embodiment.

A pixel value control unit 4 corrects the brightness ratio information 2 for each frame. For example, the brightness ratio information 2 is corrected for 60 images every second. A method of correcting the brightness ratio information is the same as in the first embodiment.

An alpha composite image 14 is generated for each frame by a weight calculating unit 18, multipliers 19 and 20, and an adder 21.

A display image generating unit 15 generates a display image for each frame.

A display panel 17 displays a display image for each frame.

Figure 8:
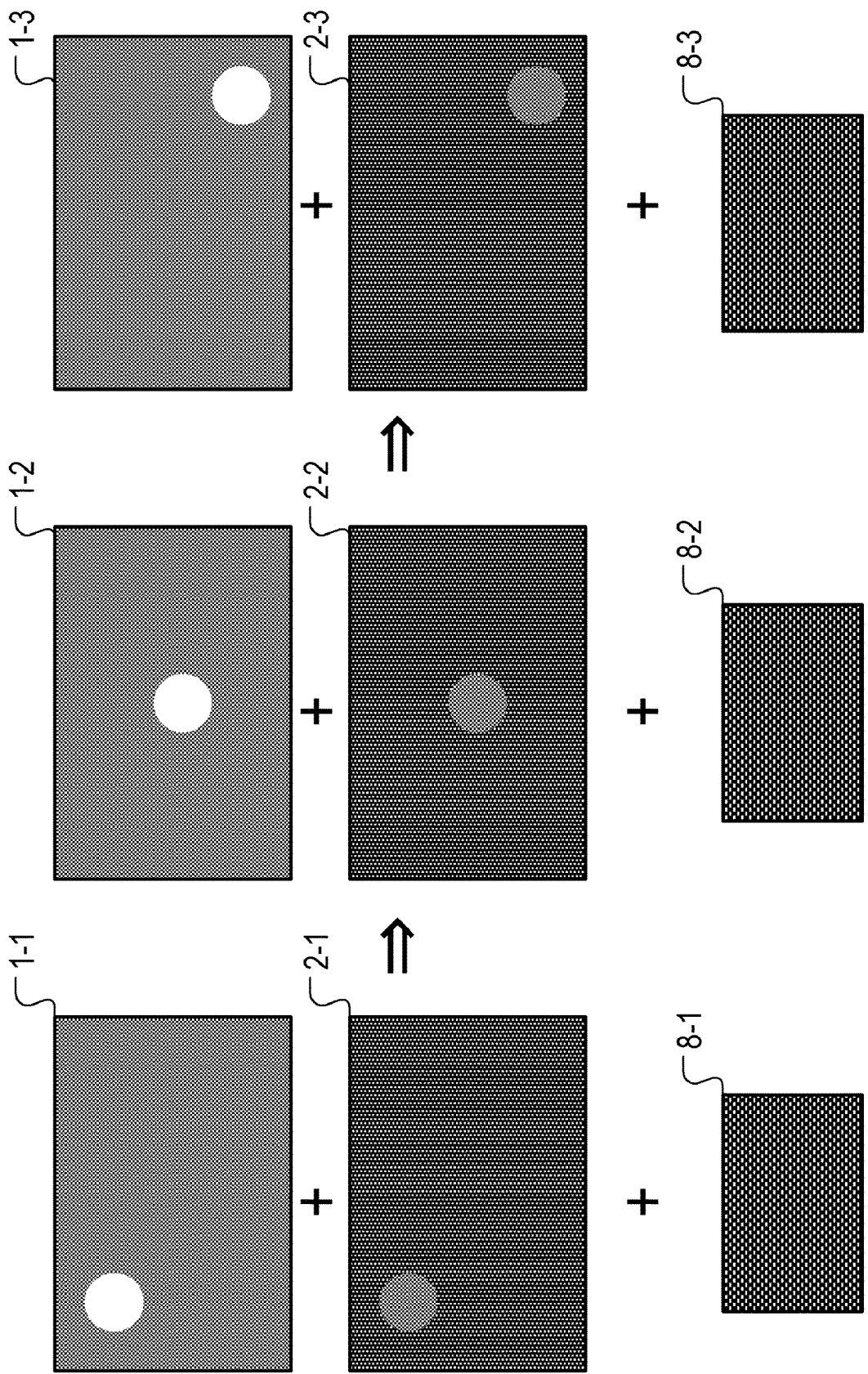
FIG. 8 is a diagram showing a base image, brightness ratio information, and a graphic image according to a third embodiment.

Next, a specific example of the base image 1, the brightness ratio information 2, and the graphic image 8 according to the present embodiment will be described with reference to FIG. 8. FIG. 8 shows an example of the base image 1, the brightness ratio information 2, and the graphic image 8 according to the present embodiment.

In FIG. 8, a base image 1-1 is a base image of a first frame, a base image 1-2 is a base image of a second frame, and a base image 1-3 is a base image of a third frame. Assuming that the frame rate is 60 fps, the base image 1-2 is input 1/60 seconds after the base image 1-1 is input, and the base image 1-3 is input 1/60 seconds after the base image 1-2 is input.

Brightness ratio information 2-1 is brightness ratio information of the first frame, brightness ratio information 2-2 is brightness ratio information of the second frame, and brightness ratio information 2-3 is brightness ratio information of the third frame.

A graphic image 8-1 is a graphic image of the first frame, a graphic image 8-2 is a graphic image of the second frame, and a graphic image 8-3 is a graphic image of the third frame.

The brightness ratio information 2 and the graphic image 8 are input in synchronization with the base image 1. In other words, the brightness ratio information 2-1 and the graphic image 8-1 are input at a same timing as the base image 1-1, and the brightness ratio information 2-2 and the graphic image 8-2 are input at a same timing as the base image 1-2. In addition, the brightness ratio information 2-3 and the graphic image 8-3 are input at a same timing as the base image 1-3.

A process in a case where information corresponding to the three frames described above is sequentially input will now be described.

First, a display image is generated using the base image 1-1, the brightness ratio information 2-1, and the graphic image 8-1. Specifically, the display brightness calculating unit 5 calculates display brightness using the base image 1-1 and the brightness ratio information 2-1. Next, the pixel value control unit 4 generates corrected brightness ratio information by correcting the brightness ratio information 2-1 based on the display brightness calculated by the display brightness calculating unit 5. Subsequently, an alpha composite image in which the graphic image 8-1 is combined on the base image 1-1 is generated. Next, a display image is generated by extending a dynamic range of the generated alpha composite image described above using the corrected brightness ratio information generated by the pixel value control unit 4.

Next, a display image is generated using the base image 1-2, the brightness ratio information 2-2, and the graphic image 8-2. The method of generating the display image is as described earlier.

Subsequently, a display image is generated using the base image 1-3, the brightness ratio information 2-3, and the graphic image 8-3.

Thereafter, a process is performed for each frame.

Figure 9:
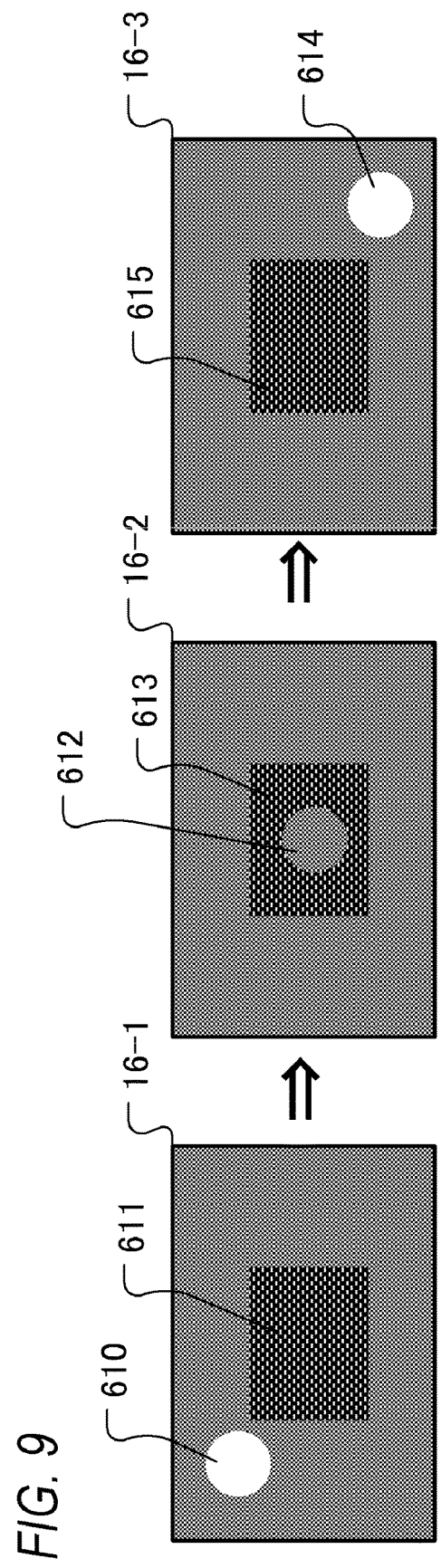
FIG. 9 is a diagram showing a display image according to the third embodiment.

Next, a specific example of the display image 16 according to the present embodiment will be described with reference to FIG. 9. FIG. 9 shows an example of the display image 16 according to the present embodiment.

In FIG. 9, a display image 16-1 is a display image generated using the base image 1-1, the brightness ratio information 2-1, and the graphic image 8-1. A display image 16-2 is a display image generated using the base image 1-2, the brightness ratio information 2-2, and the graphic image 8-2. A display image 16-3 is a display image generated using the base image 1-3, the brightness ratio information 2-3, and the graphic image 8-3.

A high-brightness region 610 of the display image 16-1 is a region outside of a region 611 of a graphic image. Therefore, brightness of the high-brightness region 610 is not limited and has a higher value than the first threshold.

A high-brightness region 612 of the display image 16-2 is a region inside a region 613 of a graphic image. Therefore, brightness of the high-brightness region 612 is limited to the first threshold or lower. Accordingly, the graphic image is prevented from becoming excessively bright.

A high-brightness region 614 of the display image 16-3 is a region outside of a region 615 of a graphic image. Therefore, brightness of the high-brightness region 614 is not limited and has a higher value than the first threshold.

As described above, according to the present embodiment, a process is performed for each frame. Accordingly, a similar effect to the first embodiment can be produced even when displaying a moving image.

Moreover, while an example in which a moving image is displayed by a display apparatus configured according to the first embodiment has been described in the present embodiment, this example is not restrictive. For example, a moving image may be displayed by the display apparatus configured as described in the second embodiment. Even in this case, a process may be performed for each frame.

<Fourth Embodiment>

Hereinafter, an image processing apparatus and an image processing method according to a fourth embodiment of the present invention will be described.

While examples in which a base image and difference information are input to a display apparatus have been described in the first to third embodiments, an example in which an HDR image that is a non-combined image is input to a display apparatus will be described in the present embodiment.

Figure 10:
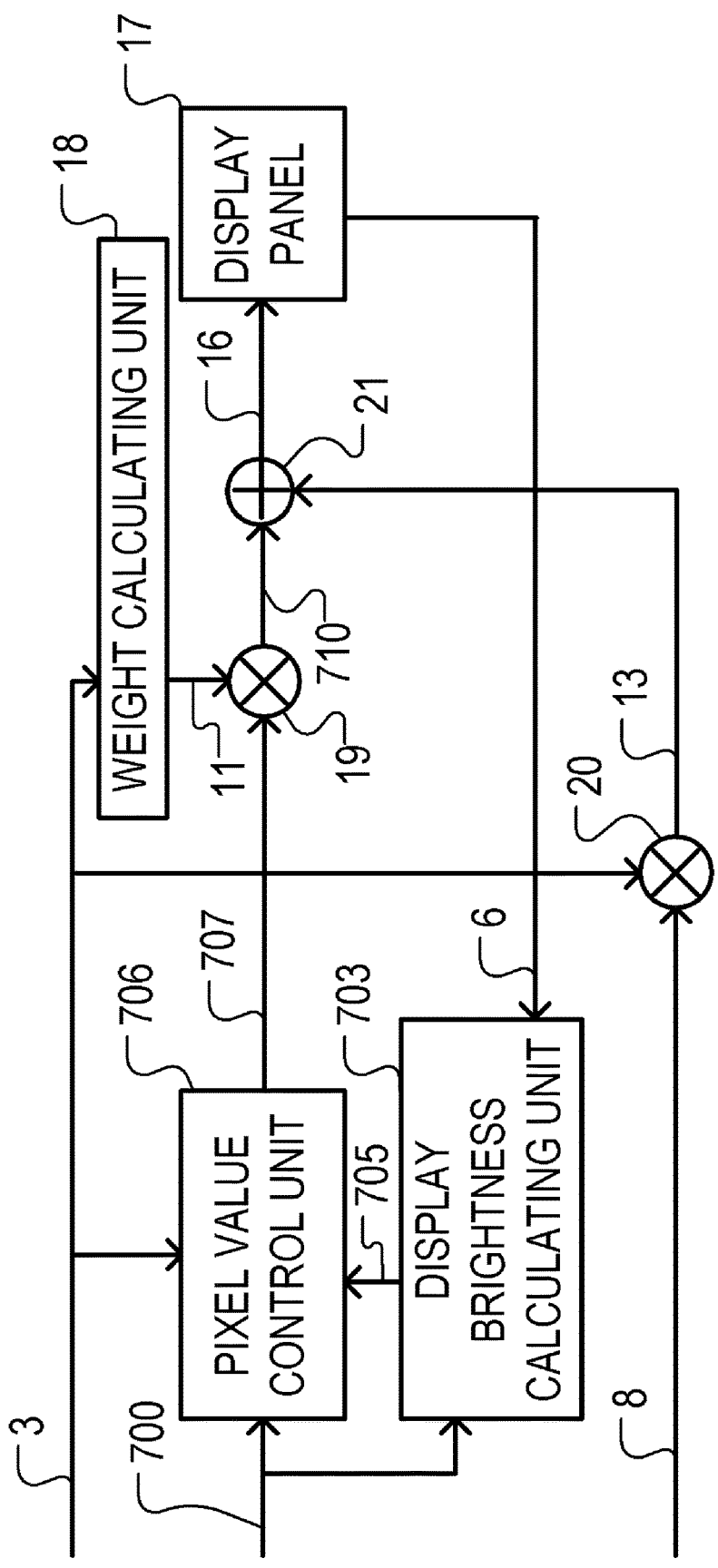
FIG. 10 is a diagram showing a functional configuration of a display apparatus according to a fourth embodiment.

First, respective functional units of the display apparatus according to the present embodiment will be described with reference to FIG. 10. FIG. 10 is a block diagram showing an example of a functional configuration of a display apparatus according to the present embodiment.

Moreover, same functional units as in the first embodiment (FIG. 1) are assigned same reference characters and descriptions thereof are omitted.

A non-combined image 700, an alpha value 3, and a graphic image 8 are input to the display apparatus according to the present embodiment. The non-combined image 700 is an HDR image. The non-combined image 700 is, for example, an ACES standard image which has a 16-bit pixel value and which is expressed in a floating point format.

A display brightness calculating unit 703 acquires the non-combined image 700. In addition, the display brightness calculating unit 703 acquires panel characteristic information 6 from a display panel 17. Subsequently, the display brightness calculating unit 703 calculates display brightness of the non-combined image 700 based on the non-combined image 700 and the panel characteristic information 6. A method of calculating the display brightness is the same as in the first embodiment. Subsequently, the display brightness calculating unit 703 outputs a calculation result of display brightness as display brightness information 705 to a pixel value control unit 706.

The pixel value control unit 706 acquires an alpha value 3, the non-combined image 700, and the display brightness information 705. In addition, the pixel value control unit 706 corrects the non-combined image 700 based on the alpha value 3 and the display brightness information 705. Specifically, a gradation value of the non-combined image 700 is corrected so that a combined image in which display brightness in a region of a graphic image is limited to a first threshold or lower is obtained. For example, the gradation value of the non-combined image 700 is corrected to a gradation value that causes display brightness (display brightness as calculated by the display brightness calculating unit 703) in the region of the graphic image to be reduced to the brightness threshold or lower. Subsequently, the pixel value control unit 706 outputs a non-combined image after correction as a corrected non-combined image 707.

The pixel value control unit 706 determines that a pixel where the alpha value 3 is larger than zero is a pixel in the region of the graphic image and outputs a pixel value obtained by correcting a pixel value of the non-combined image 700 based on the display brightness information 705 as a pixel value of the corrected non-combined image 707. In addition, the pixel value control unit 706 determines a pixel where the alpha value 3 is zero is not a pixel in the region of the graphic image and outputs a pixel value of the non-combined image 700 as a pixel value of the corrected non-combined image 707.

After processes of the display brightness calculating unit 703 and the pixel value control unit 706 are performed, alpha composition is performed in a similar manner to the first embodiment using a weight calculating unit 18, multipliers 19 and 20, and an adder 21. As a result, a weighted non-combined image 710 obtained by multiplying a pixel value of the corrected non-combined image 707 by a base weight 11 is output from the multiplier 19. The adder 21 generates a brightness-limited image as an alpha composite image. In addition, the adder 21 outputs the alpha composite image as a display image 16.

As described above, according to the present embodiment, brightness of a combined image is limited by directly correcting a gradation value of a non-combined image instead of indirectly correcting the gradation value of the non-combined image by correcting difference information. As a result, even when a non-combined image is input to an apparatus, a combined image (brightness-limited image) with improved visibility of a graphic image can be generated as a display image.

<Fifth Embodiment>

Hereinafter, an image processing apparatus and an image processing method according to a fifth embodiment of the present invention will be described.

Examples of a case in which an image processing apparatus is provided in a display apparatus have been described in the first to fourth embodiments. In the present embodiment, an example of a case in which an image processing apparatus is a separate apparatus from a display apparatus will be described.

While an example in which an image processing apparatus is provided in an imaging apparatus will be described in the present embodiment, the image processing apparatus may be provided in an apparatus that differs from the imaging apparatus. For example, the image processing apparatus may be provided in an image reproducing apparatus that reproduces images recorded on a recording medium.

Figure 11:
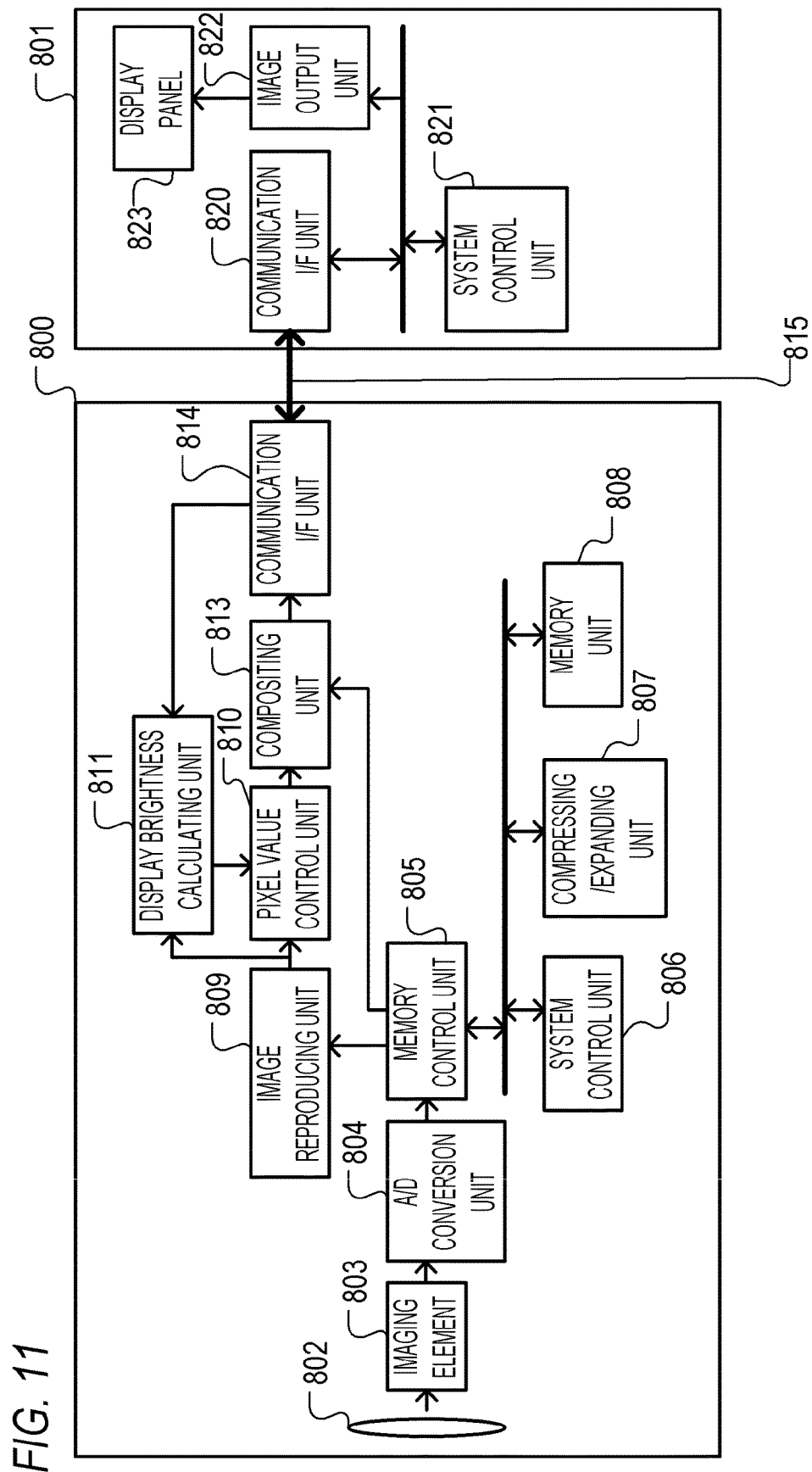
FIG. 11 is a diagram showing a configuration of an image displaying system according to a fifth embodiment.

First, an image displaying system according to the present embodiment will be described with reference to FIG. 11.

The image displaying system according to the present embodiment includes an imaging apparatus 800 and a display apparatus 801. The imaging apparatus 800 and the display apparatus 801 are connected so as to be capable of communicating with each other by a wired connection or a wireless connection. In FIG. 11, the imaging apparatus 800 and the display apparatus 801 are connected with each other using a communication cable 815.

The imaging apparatus 800 has a built-in imaging element such as a digital camera or a digital camcorder, reproduces a captured image, and outputs the reproduced image to the display apparatus 801. In addition, the imaging apparatus 800 is capable of performing alpha composition of a graphic image on a reproduced image.

The display apparatus 801 displays the image output from the imaging apparatus 800.

Respective functional units of the imaging apparatus 800 will be described.

An imaging lens 802 is an optical lens that forms a subject image on an imaging element 803.

The imaging element 803 is a photoelectric conversion element that converts the formed subject image into analog data (analog signal) and outputs the obtained analog data.

An A/D conversion unit 804 is a circuit that converts the analog data output from the imaging element 803 into digital data (digital signal).

A memory control unit 805 performs data transmission/reception with the A/D conversion unit 804, a compressing/expanding unit 807, a memory unit 808, an image reproducing unit 809, and a compositing unit 813. For example, the memory control unit 805 writes digital data output from the A/D conversion unit 804 into the memory unit 808. Digital data that is output from the A/D conversion unit 804 is image data representing a photographed image.

The memory unit 808 is a recording medium capable of storing image data. As the memory unit 808, an optical disk, a magnetic disk, a semiconductor memory, or the like can be used.

The system control unit 806 is a circuit that comprehensively controls the respective functional units of the imaging apparatus 800.

The compressing/expanding unit 807 reduces a data amount of image data or restores the data amount of image data to an original data amount by performing a compressing/expanding (decompressing) process such as discrete cosine transform (DCT) on the image data. For example, the memory control unit 805 reads image data from the memory unit 808, causes the compressing/expanding unit 807 to perform a compressing/expanding process on the read image data, and writes the image data after the compressing/expanding process into the memory unit 808.

The image reproducing unit 809 reads out image data (HDR image; non-combined image) from the memory unit

808 via the memory control unit 805. In addition, the image reproducing unit 809 outputs the read non-combined image.

The display brightness calculating unit 811 acquires the non-combined image from the image reproducing unit 809 and acquires panel characteristic information 812 from the display apparatus 801. The panel characteristic information 812 is acquired via the communication I/F unit 814. In addition, the display brightness calculating unit 811 calculates display brightness (estimated value) of the non-combined image based on the panel characteristic information 812. A method of calculating the display brightness is the same as in the first embodiment. Subsequently, the display brightness calculating unit 811 outputs display brightness information representing a calculation result of display brightness to the pixel value control unit 810.

The pixel value control unit 810 acquires the non-combined image from the image reproducing unit 809 and acquires display brightness information from the display brightness calculating unit 811. In addition, the pixel value control unit 810 generates a corrected non-combined image by correcting the non-combined image based on the display brightness information. In the present embodiment, a region of a graphic image is set in advance and a corrected non-combined image is generated by a same method as in the fourth embodiment. Subsequently, the pixel value control unit 810 outputs the corrected non-combined image to the compositing unit 813.

The compositing unit 813 reads out image data (graphic image) from the memory unit 808 via the memory control unit 805. In addition, the compositing unit 813 performs alpha composition of the corrected non-combined image and the graphic image. Using the corrected non-combined image enables a brightness-limited image to be obtained as an image after alpha composition. The compositing unit 813 outputs the generated brightness-limited image.

The communication I/F unit 814 is connected to a communication I/F unit 820 of the display apparatus 801 via the communication cable 815. The communication I/F unit 814 acquires the panel characteristic information 812 from the display apparatus 801 and outputs the acquired panel characteristic information 812 to the display brightness calculating unit 811. In addition, the communication I/F unit 814 acquires the brightness-limited image from the compositing unit 813 and outputs the acquired brightness-limited image to the display apparatus 801 as a display image.

Respective functional units of the display apparatus 801 will now be described.

The communication I/F unit 820 outputs the panel characteristic information 812 to the communication I/F unit 814. In addition, the communication I/F unit 820 acquires a brightness-limited image from the communication I/F unit 814 and outputs the acquired brightness-limited image.

A system control unit 821 is a circuit that comprehensively controls the respective functional units of the display apparatus 801.

An image output unit 822 acquires the brightness-limited image from the communication I/F unit 820 and outputs the acquired brightness-limited image so as to coincide with an operation timing of a display panel 823.

The display panel 823 displays the brightness-limited image output from the image output unit 822.

As described above, according to the present embodiment, a combined image (brightness-limited image) in which visibility of a graphic image has been improved can be generated as a display image by an apparatus separate from a display apparatus. Accordingly, an image that provides a highly visible graphic image can be presented to the user of the display apparatus.

Moreover, while an example of a case where an HDR image is obtained by imaging has been described in the present embodiment, a base image and a difference image may be obtained by imaging. In this case, brightness may be limited by a similar method to those according to the first to third embodiments.

Moreover, while an example of reducing brightness of a pixel that causes brightness to equal or exceed a first threshold among pixels of a graphic image has been described in the first to fifth embodiments, this example is not restrictive. For example, brightness of an entire graphic image may be reduced or brightness of an entire combined image may be reduced. However, restricting a region in which brightness is reduced to a part of an image enables display quality in other regions to be maintained.

<Sixth Embodiment>

Hereinafter, an image processing apparatus and an image processing method according to a sixth embodiment of the present invention will be described.

In the first to fifth embodiments, an example of generating a brightness-limited image in which brightness of a region of a graphic image is limited has been described. In the present embodiment, an example of generating a brightness-limited image in which brightness of a region in a periphery of the graphic image is limited will be described.

Moreover, while an example of a case in which transparency of a graphic image is zero or, in other words, a case of an image in which the graphic image does not allow transmittance of a background will be described in the present embodiment, alternatively, the graphic image may be an image that allows transmittance of a background.

Figure 12:
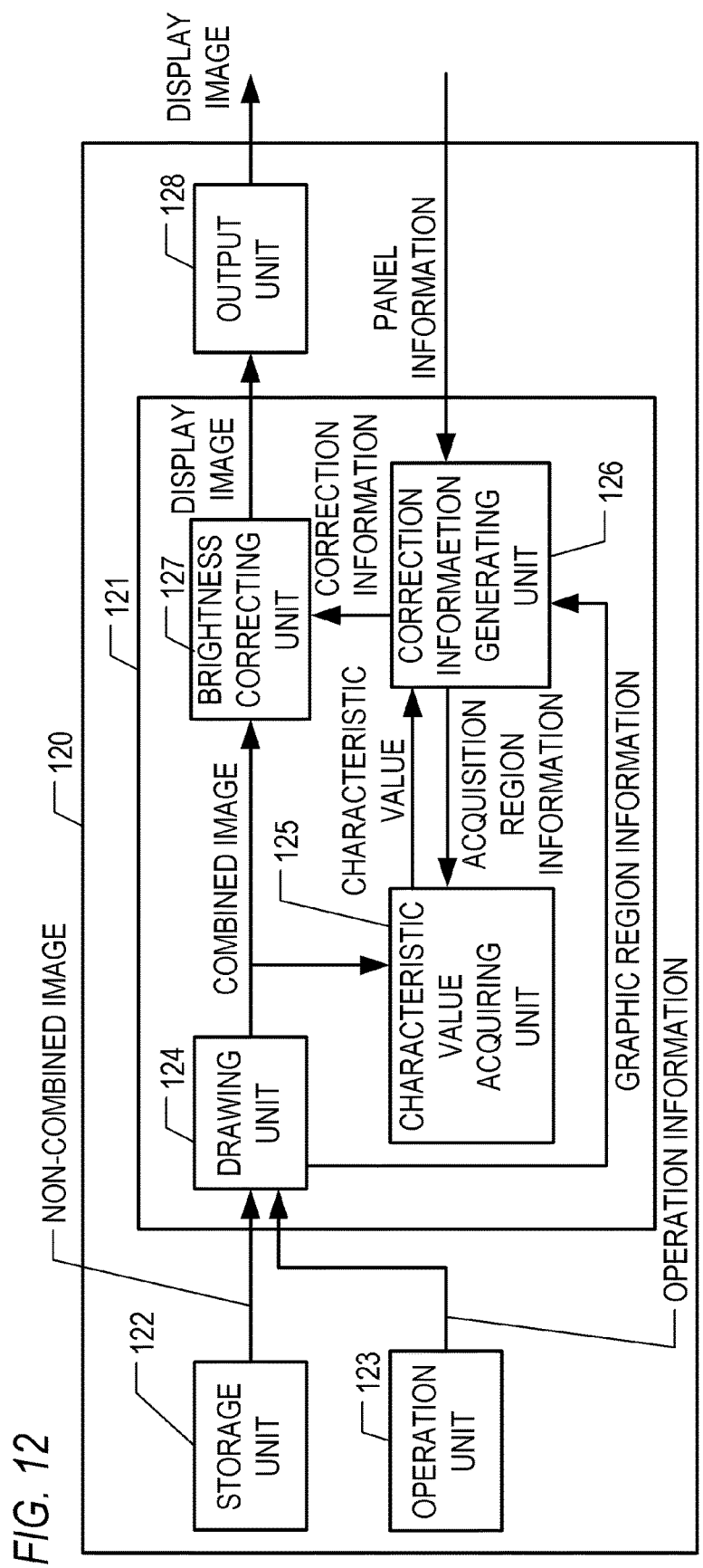
FIG. 12 is a diagram showing a functional configuration of an image processing apparatus according to a sixth embodiment.

First, respective functional units of an image processing apparatus according to the present embodiment will be described with reference to FIG. 12. FIG. 12 is a block diagram showing an example of a functional configuration of an image processing apparatus 120 according to the present embodiment.

As shown in FIG. 12, the image processing apparatus 120 includes a display image generating unit 121, a storage unit 122, an operating unit 123, an output unit 128, and the like. The display image generating unit 121 includes a drawing unit 124, a feature amount acquiring unit 125, a correction information generating unit 126, a brightness correcting unit 127, and the like.

The image processing apparatus 120 generates a display image for each frame. In addition, a display apparatus (not shown) connected to the image processing apparatus displays the display image for each frame.

The display image generating unit 121 generates a display image. The display image generating unit 121 is realized using, for example, a computing apparatus such as a microcomputer. The display image generating unit 121 includes the drawing unit 124, the feature amount acquiring unit 125, the correction information generating unit 126, the brightness correcting unit 127, and the like. These functional units may be realized by hardware or may be realized by software.

The storage unit 122 records a plurality of images. The storage unit 122 outputs one of the plurality of images to the drawing unit 124 in response to a request from the drawing unit 124. In the present embodiment, an HDR image is to be output to the drawing unit 124 as a non-combined image. As the storage unit 122, a magnetic disk, an optical disk, a semiconductor memory, or the like can be used.

The operating unit 123 is a user interface for accepting user operations. When a user operation is performed, the operating unit 123 outputs operation information representing the user operation to the drawing unit 124. As the operating unit 123, a mouse, a keyboard, or the like can be used.

The drawing unit 124 decodes the non-combined image transmitted from the storage unit 122. In addition, the drawing unit 124 draws a graphic image on the non-combined image based on the operation information output from the operating unit 123. In other words, the drawing unit 124 combines a graphic image onto the non-combined image. For example, the graphic image is recorded in advance in the drawing unit 124. In addition, the drawing unit 124 outputs a combined image in which the graphic image is combined on the non-combined image to the feature amount acquiring unit 125 and the brightness correcting unit 127. Furthermore, the drawing unit 124 outputs graphic region information indicating a region of the graphic image to the correction information generating unit 126. The graphic region information represents a position, a size, a shape, and the like of the graphic image.

Moreover, when a graphic image is not combined onto the non-combined image, the drawing unit 124 outputs the non-combined image to the brightness correcting unit 127 and does not output graphic region information.

The feature amount acquiring unit 125 acquires the combined image from the drawing unit 124 and acquires acquisition region information indicating a region in which a feature amount is to be acquired (acquisition region) from the correction information generating unit 126. In addition, the feature amount acquiring unit 125 acquires a feature amount of the combined image in the acquisition region and outputs the acquired feature amount to the correction information generating unit 126.

Moreover, while an example in which a histogram of a brightness value is acquired as a feature amount will be described in the present embodiment, a feature amount is not limited thereto. A feature amount may be any information representing lightness. For example, a histogram of a pixel value, a representative value of a pixel value, or a representative value of a brightness value may be used. Examples of a representative value include a maximum value, a minimum value, a mode value, a median value, and an average value.

The correction information generating unit 126 acquires graphic region information from the drawing unit 124 and acquires panel information from the display apparatus (not shown) connected to the image processing apparatus 120. The panel information includes support information, a panel size, maximum display brightness, and the like. Support information represents whether or not the display apparatus supports display of an HDR image. A panel size represents a size of a screen. Maximum display brightness represents a maximum value of brightness that can be displayed by the display apparatus.

In addition, the correction information generating unit 126 determines an acquisition region based on the graphic region information and the panel information and outputs acquisition region information indicating the determined acquisition region to the feature amount acquiring unit 125. In the present embodiment, a region in a periphery of the graphic image is determined as an acquisition region.

Furthermore, the correction information generating unit 126 acquires a feature amount from the feature amount acquiring unit 125.

In addition, the correction information generating unit 126 generates correction information that indicates at which position in the combined image brightness is to be reduced as well as a degree of reduction and outputs the generated correction information to the brightness correcting unit 127.

The brightness correcting unit 127 acquires the combined image from the drawing unit 124 and acquires correction information from the correction information generating unit 126. In addition, the brightness correcting unit 127 generates a brightness-limited image by correcting the combined image based on the correction information. Subsequently, the brightness correcting unit 127 outputs the generated brightness-limited image to the output unit 128 as a display image.

Moreover, when a graphic image is not to be combined on the non-combined image, the brightness correcting unit 127 outputs the non-combined image output from the drawing unit 124 to the output unit 128 as a display image.

The output unit 128 outputs the display image output from the brightness correcting unit 127 to the outside of the image processing apparatus 120. For example, the output unit 128 outputs the display image to a display apparatus connected to the image processing apparatus 120. The output unit 128 includes, for example, an output terminal for outputting image data and a processing circuit thereof. As the output terminal, a terminal conforming to a communication standard such as Digital Visual Interface (DVI) and High-Definition Multimedia Interface (HDMI) (registered trademark) can be used.

Figure 13:
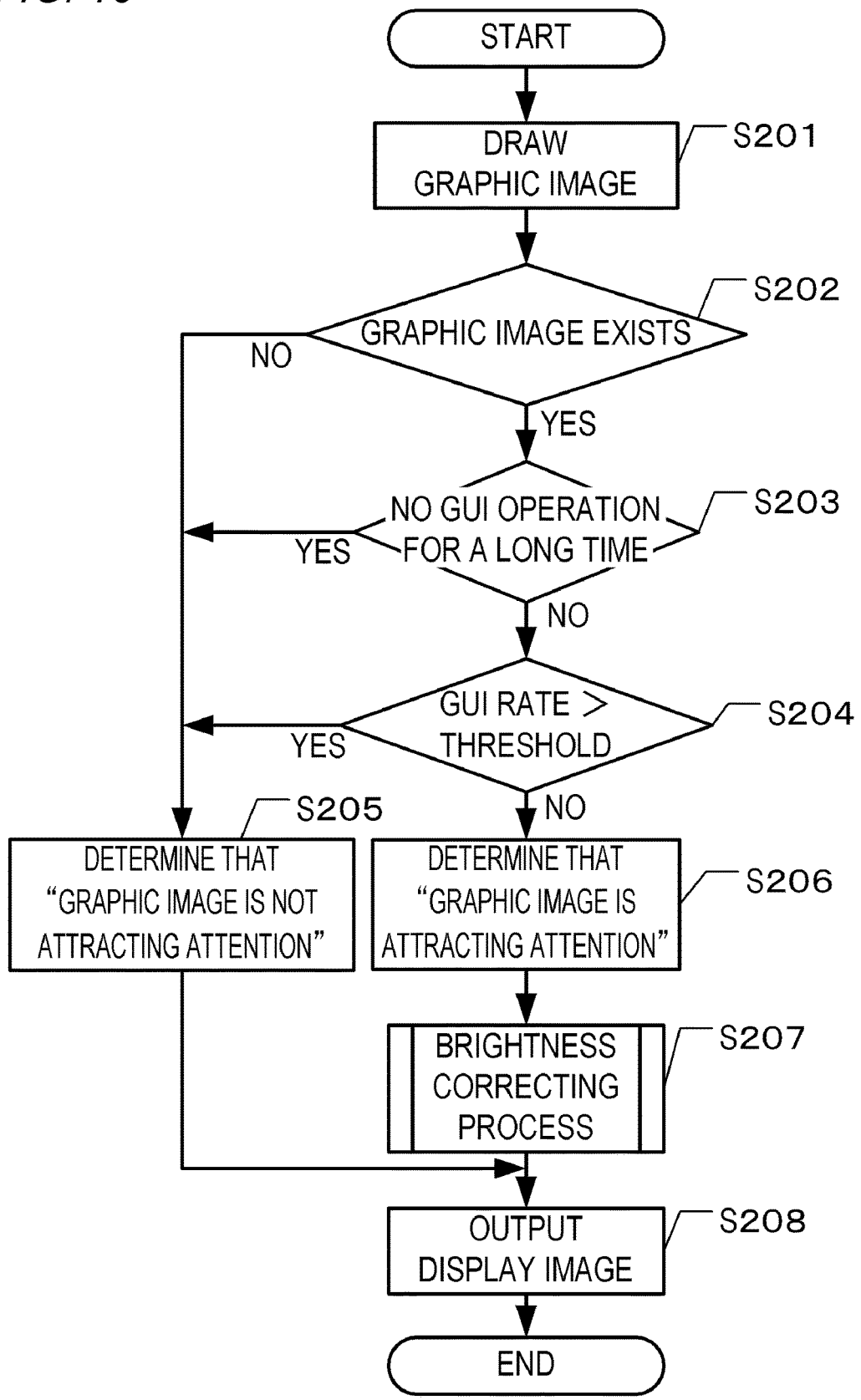
FIG. 13 is a diagram showing a flow of processes of an image processing apparatus according to the sixth embodiment.

Next, a processing procedure of the image processing apparatus 120 will be described with reference to FIG. 13. FIG. 13 is a flow chart showing an example of a flow of processes of the image processing apparatus 120.

First, the drawing unit 124 decodes a non-combined image output from the storage unit 122 and draws a graphic image based on operation information output from the operating unit 123 (S201). Accordingly, a combined image in which the graphic image is combined on the non-combined image is generated.

Moreover, depending on the operation information, a graphic image may not be drawn.

Next, based on graphic region information, the correction information generating unit 126 determines whether or not the graphic image exists in an image output from the drawing unit 124 (S202). As described earlier, in the present embodiment, when a graphic image is not drawn, graphic region information is not output from the drawing unit 124. Therefore, the correction information generating unit 126 determines that a graphic image exists when graphic region information is output from the drawing unit 124, and the correction information generating unit 126 determines that a graphic image does not exist when graphic region information is not output from the drawing unit 124. The process is advanced to S203 when a graphic image exists, and the process is advanced to S205 when a graphic image does not exist.

Moreover, when a graphic image is not drawn, graphic region information indicating that a graphic image does not exist may be output from the drawing unit 124. In such a case, the determination described above can be made by checking contents of the graphic region information.

In S203, based on the graphic region information, the correction information generating unit 126 determines whether or not a user operation (GUI operation) with respect to a graphic image has not been performed for a period of time equal to or longer than a fourth threshold. For example, the correction information generating unit 126 periodically acquires graphic region information and make s the above determination based on a change in the graphic region information over time. When a user operation with respect to the graphic image has not been performed for a period of time equal to or longer than the fourth threshold, the process is advanced to S205. When a user operation with respect to the graphic image has been performed within a period of time equal to the fourth threshold, the process is advanced to S204.

Moreover, the fourth threshold may be a fixed value set in advance by a manufacturer or a value that can be changed by the user.

In S204, based on graphic region information, the correction information generating unit 126 determines whether or not a region of the graphic image is changing at a higher rate than a fifth threshold. In other words, a determination is made on whether or not a change rate (GUI rate) of the region of the graphic image is higher than the fifth threshold. For example, the correction information generating unit 126 periodically acquires graphic region information and makes the above determination based on a degree of change in the graphic region information over time. When the region of the graphic image is changing at a higher rate than the fifth threshold, the process is advanced to S205. When the region of the graphic image is changing at a rate that is equal to or lower than the fifth threshold, the process is advanced to S206.

Moreover, the fifth threshold may be a fixed value set in advance by a manufacturer or a value that can be changed by the user.

When an operation has not been performed on the graphic image for an extended period of time, it is likely that the user's attention is not focused on the graphic image among the displayed display image. In addition, when the change rate of a region of the graphic image is high, it is likely that the user's attention is not focused on the graphic image among the displayed display image.

Therefore, in S205, the correction information generating unit 126 determines that the user's attention is not focused on the graphic image. Subsequently, the correction information generating unit 126 outputs correction information (non-correction information) indicating that a combined image will not be corrected to the brightness correcting unit 127. When non-correction information is output from the correction information generating unit 126, the brightness correcting unit 127 omits a process for generating a brightness-limited image and outputs the combined image output from the drawing unit 124 to the output unit 128 as a display image. Subsequently, the process is advanced to S208. A similar process is performed when it is determined in S202 that a graphic image does not exist.

In S206, the correction information generating unit 126 determines that the user's attention is focused on the graphic image. Subsequently, the process is advanced to S207.

Moreover, when a plurality of graphic images are drawn on the non-combined image, the processes of S203 and S204 are performed for each drawn graphic image. In addition, when a graphic image attracting the attention of the user exists among the plurality of graphic images, the process is advanced to S206, and when a graphic image attracting the attention of the user does not exist among the plurality of graphic images, the process is advanced to S205.

Moreover, one of or both of the processes of S203 and S204 may be omitted. A determination of whether or not the user's attention is focused on a graphic image may be made using a different method from the processes of S203 and S204. For example, a line of sight of the user may be detected using a camera, and a determination of whether or not the user's attention is focused on a graphic image may be made based on a result of detection of the line of sight and on graphic region information.

In S207, a brightness correcting process is performed and a brightness-limited image is output from the brightness correcting unit 127 to the output unit 128 as a display image. Subsequently, the process is advanced to S208. Details of the brightness correcting process will be described later.

In S208, the output unit 128 outputs the display image output from the brightness correcting unit 127 to the outside of the image processing apparatus 120.

Figure 14:
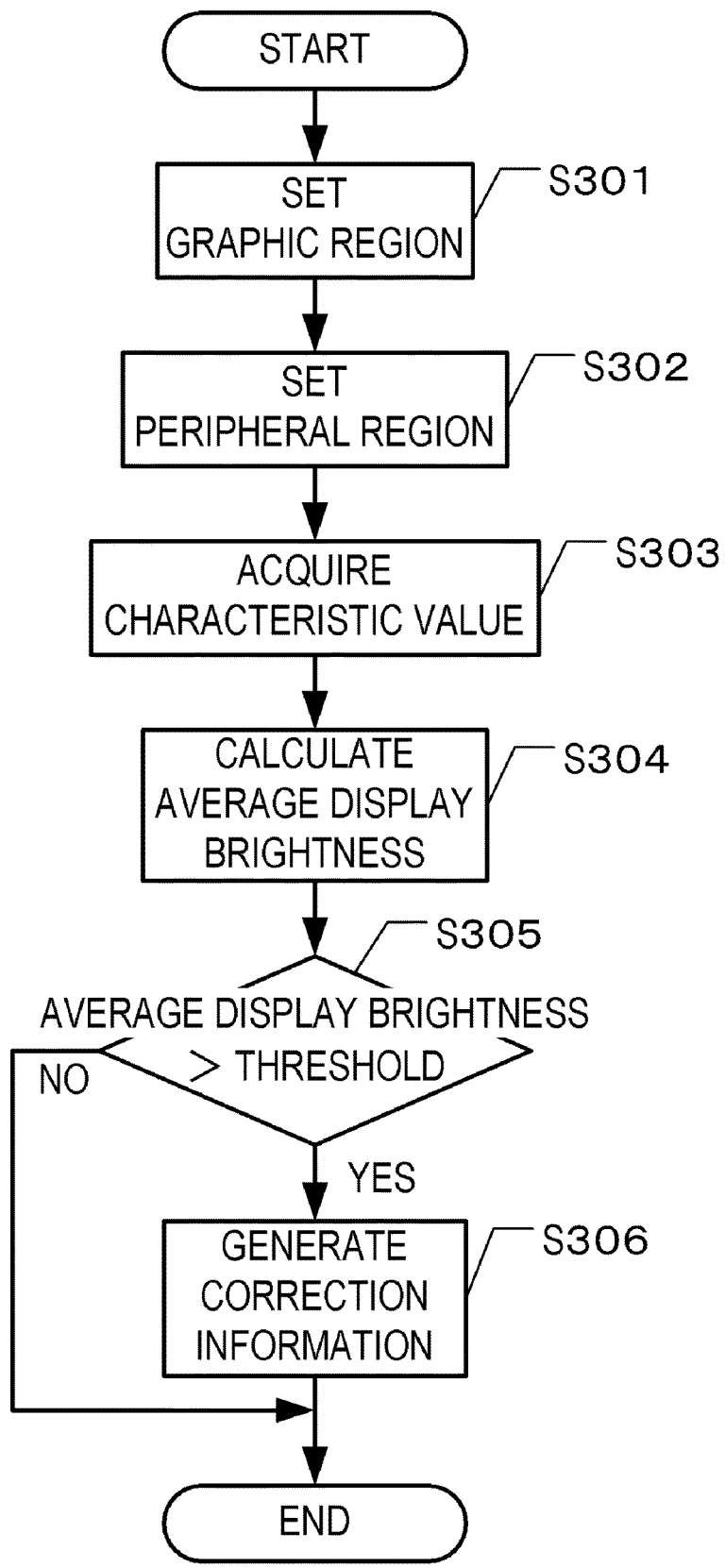
FIG. 14 is a diagram showing a flow of a brightness correcting process according to the sixth embodiment.

Next, a procedure of the brightness correcting process (the process in S207) according to the present embodiment will be described with reference to FIG. 14. FIG. 14 is a flow chart showing an example of a flow of a brightness correcting process according to the present embodiment.

First, the correction information generating unit 126 sets a graphic region based on graphic region information output from the drawing unit 124 (S301). The graphic region represents a region of a graphic image.

Moreover, when a plurality of graphic images are drawn by the drawing unit 124, only a graphic region regarding a graphic image that is determined to be attracting the attention of the user is set.

Next, the correction information generating unit 126 sets a region in a periphery of the graphic region set in S301 as a peripheral region (acquisition region) (S302).

Moreover, while an example of a case in which a graphic region is not included in a peripheral region will be described in the present embodiment, a region including a graphic region may be set as a peripheral region.

Specific examples of the processes of S301 and S302 will be described with reference to FIG. 15.

Figure 15:
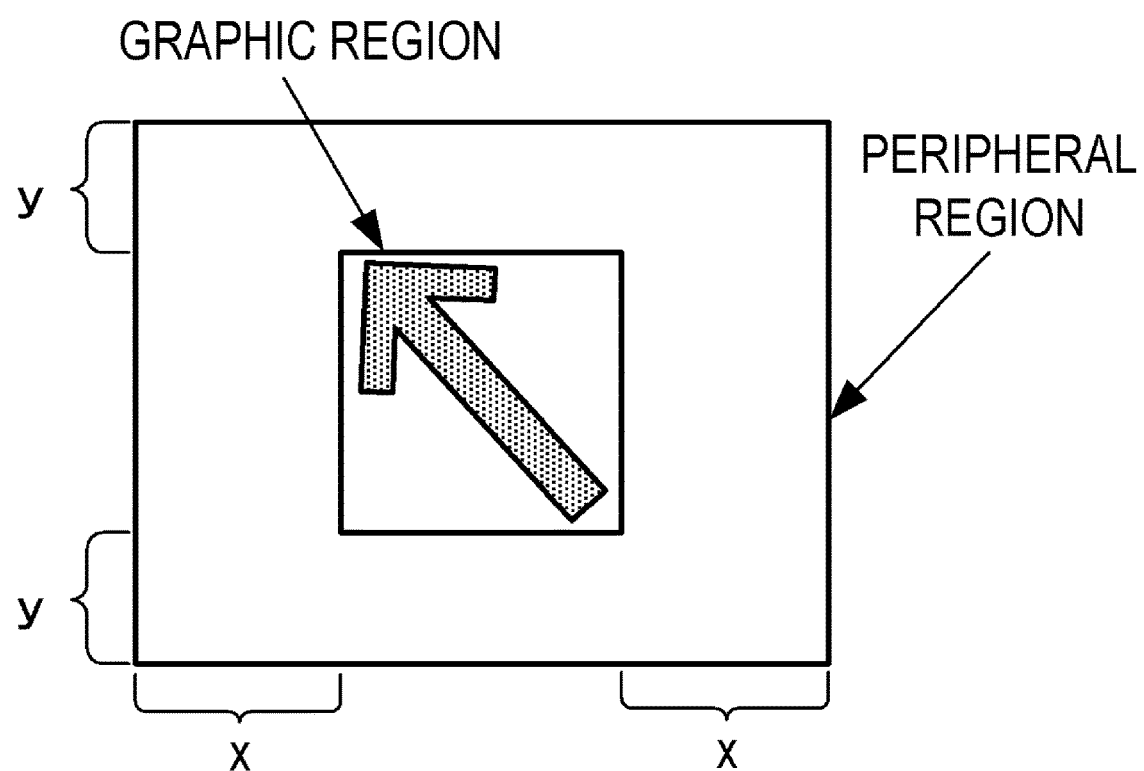
FIG. 15 is a diagram showing a graphic region and a peripheral region according to the sixth embodiment.

In FIG. 15, an arrow image (mouse cursor) represents a graphic image. In S301, a minimum rectangular region enclosing the graphic image is set as a graphic region.

In S302, a region obtained by excluding the graphic region from an extended region created by extending the graphic region is set as a peripheral region. The extended region is a rectangular region. An upper side of the extended region is separated upward from an upper side of the graphic region by y-number of pixels and a lower side of the extended region is separated downward from a lower side of the graphic region by y-number of pixels. A right side of the extended region is separated rightward from a right side of the graphic region by x-number of pixels and a left side of the extended region is separated leftward from a left side of the graphic region by x-number of pixels. Values of x and y are determined based on the panel size that is included in the panel information. A panel size is, for example, information expressing a size of screen in "inches" or "cm".

When the user's attention is focused on a graphic image, a peripheral region is a region that is close to a location directly viewed by the user. Specifically, a peripheral region is a region of influence that is assumed to have a major influence on visibility of the graphic image when the user's attention is focused on the graphic image.

Assuming that a distance between the user and the screen is constant and a display image is displayed enlarged or reduced so as to conform to the size of the screen, the bigger the size of the screen, the smaller the size of the region of interest relative to the size of the screen. Therefore, favorably, the bigger the size of the screen, the smaller the adopted values of x and y. In addition, a field of view of a human being is generally wider in a horizontal direction than in a vertical direction. Therefore, favorably, a larger value than the value of y is used as the value of x.

In the present embodiment, values of x and y are determined using Equations 4-1 and 4-2 below. In Equation 4-1, X-number of pixels denotes a total number of pixels of the combined image in the horizontal direction, gx [cm] denotes a size (size corresponding to x) of a region of influence in the horizontal direction, and lx [cm] denotes a size of the screen in the horizontal direction. In Equation 4-2, Y-number of pixels denotes a total number of pixels of the combined image in the vertical direction, gy [cm] denotes a size (size corresponding to y) of a region of influence in the vertical direction, and ly [cm] denotes a size of the screen in the vertical direction.

$$x = X \times gx / lx \quad \text{(Equation 4-1)}$$

$$y = Y \times gy / ly \quad \text{(Equation 4-2)}$$

For example, let us assume that a size of the combined image is 1920 pixels in the horizontal direction by 1080 pixels in the vertical direction and a size of a screen is 24 inches (53.1 [cm] in the horizontal direction by 29.9 [cm] in the vertical direction). Let us also assume that a size of the region of influence in the horizontal direction is 3 [cm] and a size of the region of influence in the vertical direction is 2 [cm]. In this case, a peripheral region is set using x=1920×3/53.1=108 pixels and y=1080×2/29.9=72 pixels.

Moreover, while an example of a case where the graphic region and the extended region are shaped as rectangular regions is described in the present embodiment, the shapes of the graphic region and the extended region are not limited to rectangular regions.

Following S302, the correction information generating unit 126 outputs acquisition region information indicating that the peripheral region set in S302 is an acquisition region to the feature amount acquiring unit 125 (S303). The feature amount acquiring unit 125 acquires a feature amount of the combined image in the acquisition region indicated by the acquisition region information and outputs the acquired feature amount to the correction information generating unit 126. In the present embodiment, the number of pixels in the acquisition region is counted for each brightness category (brightness value or brightness range) and a brightness histogram is acquired as a feature amount. A brightness range is a range of brightness values with a predetermined width.

Next, the correction information generating unit 126 calculates an average display brightness (average value of display brightness) of the peripheral region based on the feature amount acquired in S303 and maximum display brightness included in the panel information (S304).

Specifically, for each brightness category, display brightness corresponding to the brightness category is estimated based on maximum display brightness. When the brightness category is a brightness value, display brightness corresponding to the brightness value is calculated. When the brightness category is a brightness range, display brightness corresponding to the brightness range is calculated. For example, display brightness corresponding to a maximum value, a minimum value, a median value, or an average value of brightness values in the brightness range is calculated. In addition, for each brightness category, the display brightness is multiplied by a frequency. Subsequently, by dividing a sum of multiplication results by a total frequency of the brightness histogram, average display brightness is calculated.

In other words, average display brightness is calculated using Equation 5 below. In Equation 5, Lave denotes average display brightness, M denotes a total number of brightness categories, Li denotes display brightness calculated for an i-th brightness category, Ni denotes a frequency of the i-th brightness category, and P denotes a total frequency of a brightness histogram.

[Expression 1]

$$Lave = \left( \sum_{i=1}^{M} Li \times Ni \right) \div P \quad \text{(Equation 5)}$$

Next, the correction information generating unit 126 determines whether or not the average display brightness calculated in S304 is higher than a threshold THave (S305). The threshold THave is, for example, 200 cd/m². When the average display brightness is higher than the threshold THave, the process is advanced to S306. On the other hand, when the average display brightness is equal to or lower than the threshold THave, the present flow is terminated. Specifically, when the average display brightness is equal to or lower than the threshold THave, the correction information generating unit 126 outputs non-correction information to the brightness correcting unit 127.

Moreover, the threshold THave is not limited to the value described above. The threshold THave may be a fixed value set by a manufacturer or a value that can be changed by the user.

In S306, the correction information generating unit 126 generates correction information including a correction value that causes the average display brightness of the peripheral region to be equal to the threshold THave and correction region information indicating a region that is a correction object, and outputs the generated correction information to the brightness correcting unit 127. In the present embodiment, peripheral region information indicating the peripheral region is generated as the correction region information. The peripheral region information is, for example, the same information as acquisition region information. The correction value is a correction value that corrects a pixel value of the combined image. In the present embodiment, a correction ratio by which a pixel value is multiplied is calculated as the correction value. Specifically, a correction ratio R is calculated using Equation 6 below.

$$R = THave/Lave \quad \text{(Equation 6)}$$

Moreover, the correction value is not limited to a correction ratio. For example, the correction value may be a value to be added to a pixel value.

Moreover, methods of expressing a region may differ between peripheral region information and acquisition region information. For example, one of the peripheral region information and the acquisition region information may express a peripheral region using coordinates of respective pixels in the peripheral region while the other may express a peripheral region using vertex coordinates of the peripheral region.

The brightness correcting unit 127 corrects brightness of the combined image in a peripheral region by multiplying each pixel value (pixel value of the combined image) in the peripheral region indicated by the peripheral region information by the correction ratio R. Accordingly, a brightness-limited image in which brightness of the peripheral region is limited to the first threshold or lower is generated. In addition, the brightness correcting unit 127 outputs the generated brightness-limited image as a display image. In other words, the brightness correcting unit 127 outputs a pixel value of the combined image output from the drawing unit 124 as a pixel value of the display image outside of the peripheral region. In addition, the brightness correcting unit 127 outputs a value obtained by multiplying the pixel value of the combined image output from the drawing unit 124 by the correction ratio R as the pixel value of the display image in the peripheral region.

As described above, according to the present embodiment, when generating a combined image as a display image, a brightness-limited image that is a combined image in which brightness in a region in a periphery of a graphic image is limited to a first threshold or lower is generated. Accordingly, a combined image (brightness-limited image) with improved visibility of the graphic image can be generated as the display image. Specifically, a situation where excessive brightness of a periphery of a graphic image makes the graphic image less visible can be avoided. As a result, operation efficiency of the user can be improved.

In addition, according to the present embodiment, whether or not the attention of the user is focused on the graphic image in a displayed display image is determined based on the graphic region information. Furthermore, when it is determined that the attention of the user is not focused on the graphic image, the process of generating a brightness-limited image is omitted. Low visibility of the graphic image does not pose a problem when the attention of the user is not focused on the graphic image. Therefore, by omitting the process of generating a brightness-limited image in such cases, processing load can be reduced. In addition, display quality of the periphery of the graphic image that is not attracting the attention of the user can be maintained.

Moreover, while an example in which brightness of a peripheral region is reduced so that average display brightness of the peripheral region equals the threshold THave has been described in the present embodiment, this example is not restrictive. The brightness of the peripheral region may be reduced so that brightness of pixels with display brightness that is equal to or higher than the threshold THave among pixels in the peripheral region becomes equal to the threshold THave. Alternatively, brightness of all pixels in the peripheral region may be reduced or brightness of pixels with display brightness that is equal to or higher than the threshold THave among pixels in the peripheral region may be reduced.

Moreover, while an example in which brightness is reduced so that display brightness becomes equal to the threshold THave has been described in the present embodiment, alternatively, brightness may be reduced so that display brightness falls below the threshold THave.

Moreover, while an example in which brightness of a combined image is directly corrected has been described in the present embodiment, alternatively, the brightness of the combined image may be indirectly corrected by correcting brightness of a non-combined image. For example, the drawing unit 124 may be provided in a subsequent stage of the brightness correcting unit 127. Specifically, the brightness correcting unit 127 may generate a corrected non-combined image by correcting brightness of the non-combined image. In addition, the drawing unit 124 may draw a graphic image on the corrected non-combined image.

<Seventh Embodiment>

Hereinafter, an image processing apparatus and an image processing method according to a seventh embodiment of the present invention will be described.

Moreover, differences from the sixth embodiment will be described and functions and the like that are similar to those of the sixth embodiment will not be described.

A configuration of an image processing apparatus according to the present embodiment is the same as in the sixth embodiment (FIG. 12). In addition, a processing procedure of the image processing apparatus according to the present embodiment is the same as in the sixth embodiment (FIG. 13). However, in the present embodiment, the drawing unit 124 is to also output a combined image to the correction information generating unit 126.

In the present embodiment, a procedure of a brightness correcting process (the process of S207) differs from that according to the sixth embodiment. An example in which brightness of a peripheral region surrounding a graphic region is reduced had been described in the sixth embodiment. In the pre sent embodiment, an example of reducing brightness of a nearby high-brightness region which includes a pixel with a gradation value equal to or higher than a second threshold and the distance of which from a graphic image is equal to or less than a third threshold will be described.

Moreover, the second and third thresholds may be fixed values set in advance by a manufacturer or values that can be changed by the user. In the present embodiment, the third threshold is a value determined by x and y described in the sixth embodiment.

Figure 16:
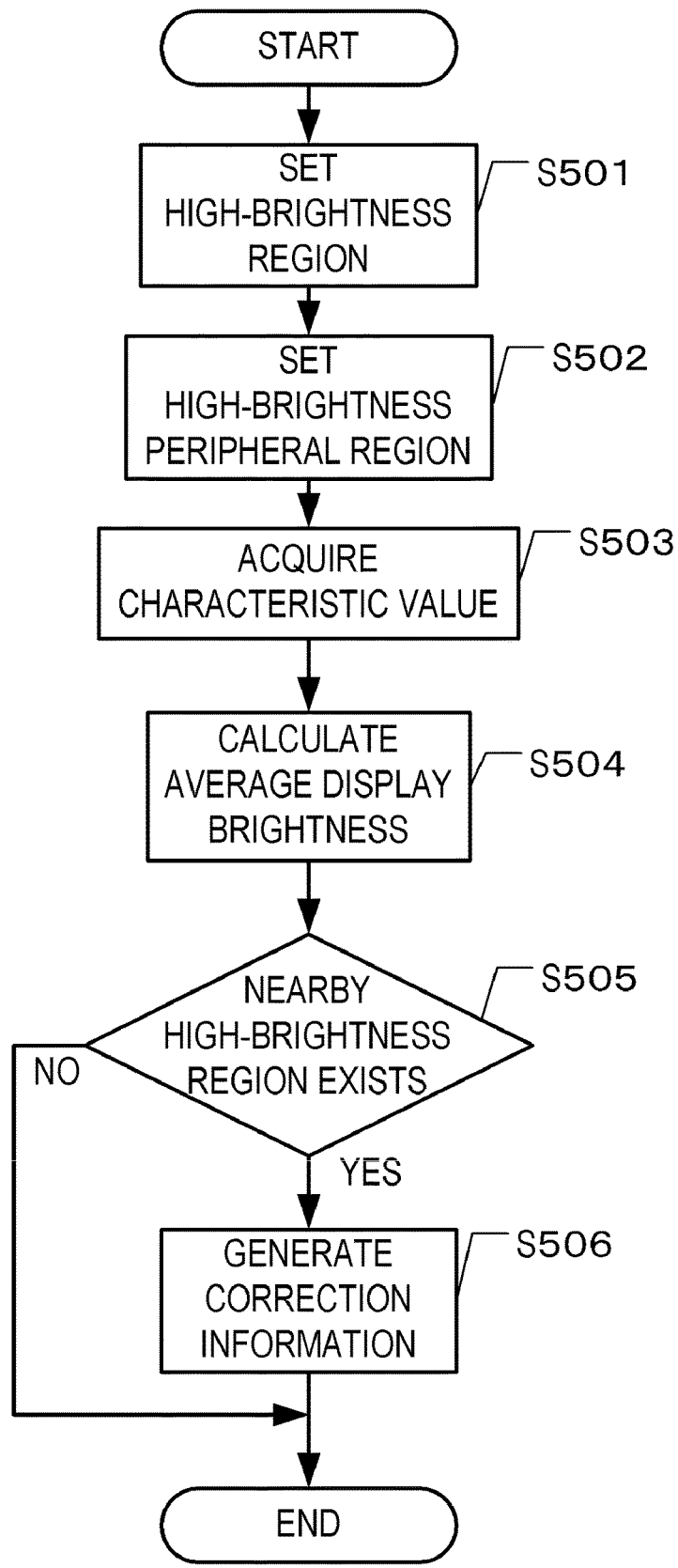
FIG. 16 is a diagram showing a flow of a brightness correcting process according to a seventh embodiment.
Figure 17:
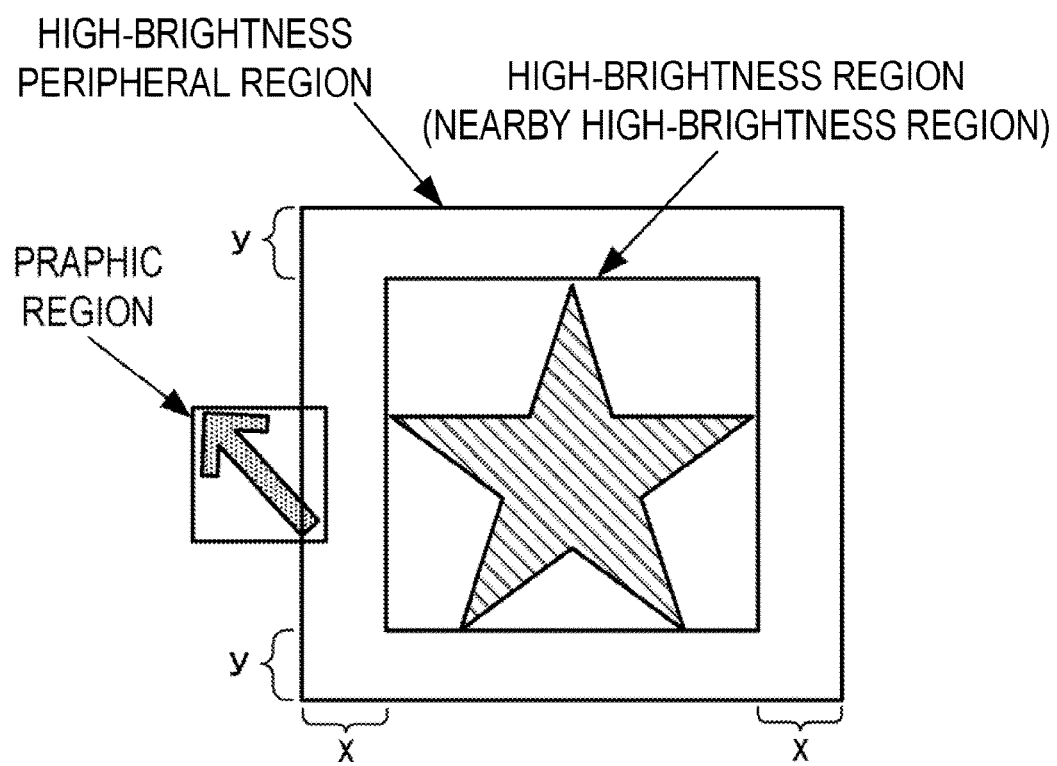
FIG. 17 is a diagram showing a high-brightness region and a high-brightness peripheral region according to the seventh embodiment.

Hereinafter, a brightness correcting process according to the present embodiment will be described with reference to FIGS. 16 and 17. FIG. 16 is a flow chart showing an example of a flow of a brightness correcting process according to the present embodiment. FIG. 17 is a diagram showing examples of a high-brightness region and a high-brightness peripheral region.

First, the correction information generating unit 126 sets a region including a pixel having a gradation value that is equal to or higher than the second threshold among a region of a combined image as a high-brightness region (S501). In the present embodiment, as shown in FIG. 17, a minimum rectangular region that encloses a region constituted by pixels having a gradation value that is equal to or higher than the second threshold is set as a high-brightness region. In FIG. 17, a star-shaped region represents a region constituted by pixels having a gradation value that is equal to or higher than the second threshold.

Alternatively, a region constituted by pixels having a gradation value that is equal to or higher than the second threshold may be set as a high-brightness region. The high-brightness region need not necessarily have a rectangular shape.

Next, the correction information generating unit 126 sets a region in a periphery of the high-brightness region set in S501 as a high-brightness peripheral region (S502). In S502, a region obtained by excluding the high-brightness region from the extended high-brightness region resulting from extending the high-brightness region is set as the high-brightness peripheral region. The extended high-brightness region is a rectangular region. As shown in FIG. 17, an upper side of the extended high-brightness region is separated upward from an upper side of the high-brightness region by y-number of pixels and a lower side of the extended high-brightness region is separated downward from a lower side of the high-brightness region by y-number of pixels. A right side of the extended high-brightness region is separated rightward from a right side of the high-brightness region by x-number of pixels and a left side of the extended high-brightness region is separated leftward from a left side of the high-brightness region by x-number of pixels. Values of x and y are determined by a method similar to that according to the sixth embodiment.

In addition, the correction information generating unit 126 outputs acquisition region information that indicates the high-brightness region set in S501 as an acquisition region to the feature amount acquiring unit 125 (S503). Accordingly, a brightness histogram of the high-brightness region is acquired by a method similar to that according to the sixth embodiment (S303).

Next, the correction information generating unit 126 calculates average display brightness of the high-brightness region by a method similar to that according to the sixth embodiment (S304) (S504).

In addition, the correction information generating unit 126 detects a nearby high-brightness region (S505). Specifically, a determination is made on whether or not the high-brightness region set in S501 is a nearby high-brightness region. In the present embodiment, a determination is made on whether or not a graphic region (a graphic region corresponding to the graphic image determined to be attracting the attention of the user in S206) overlaps at least one of the high-brightness region and the high-brightness peripheral region. In addition, a high-brightness region in which a graphic region overlaps at least one of the high-brightness region and the high-brightness peripheral region is detected as a nearby high-brightness region.

When a nearby high-brightness region is detected, the process is advanced to S506. When a nearby high-brightness region is not detected, the present flow is terminated. Specifically, when a nearby high-brightness region is not detected, the correction information generating unit 126 outputs non-correction information to the brightness correcting unit 127.

Alternatively, in S505, a determination may be made on whether or not a graphic region overlaps a high-brightness region. Subsequently, the high-brightness region which the graphic region overlaps may be detected as a nearby high-brightness region. In other words, a high-brightness region in which a graphic region overlaps with a high-brightness peripheral region and a graphic region does not overlap with a high-brightness region need not be detected as a nearby high-brightness region. In the case of such a configuration, a high-brightness peripheral region need not be set.

In S506, the correction information generating unit 126 generates correction information including a correction value that causes the average display brightness of the nearby high-brightness region to be equal to the threshold THave and correction region information, and outputs the generated correction information to the brightness correcting unit 127. In the present embodiment, nearby high-brightness region information indicating the nearby high-brightness region is generated as the correction region information. The correction value is calculated by a method similar to that according to the sixth embodiment (S306).

In addition, the brightness correcting unit 127 generates a brightness-limited image by correcting brightness of a combined image in the high-brightness region by a method similar to that of S306.

As described above, according to the present embodiment, when generating a combined image as a display image, a brightness-limited image that is a combined image in which brightness in a nearby high-brightness region is limited to a first threshold or lower is generated. Accordingly, a combined image (brightness-limited image) with improved visibility of the graphic image can be generated as the display image. Specifically, a situation where excessive brightness of a nearby high-brightness region makes the graphic image less visible can be avoided. As a result, operation efficiency of the user can be improved.

Furthermore, display quality of a region other than a nearby high-brightness region among a region in a periphery of the graphic image can be maintained.

In addition, unless a non-combined image changes, the high-brightness region and the high-brightness peripheral region do not change. Therefore, when the non-combined image does not change, the high-brightness region and the high-brightness peripheral region need not be updated. As a result, according to the present embodiment, processing load can be can be reduced more than in the sixth embodiment.

Moreover, while an example in which brightness of a nearby high-brightness region is reduced so that average display brightness of the nearby high-brightness region equals the threshold THave has been described in the present embodiment, this example is not restrictive. The brightness of the nearby high-brightness region may be reduced so that brightness of pixels with display brightness that is equal to or higher than the threshold THave among pixels in the nearby high-brightness region becomes equal to the threshold THave. Alternatively, brightness of all pixels in the nearby high-brightness region may be reduced or brightness of pixels with display brightness that is equal to or higher than the threshold THave among pixels in the nearby high-brightness region may be reduced. In addition, a graphic image may be overlapped with the nearby high-brightness region. Therefore, brightness of a region not overlapped by the graphic image among the nearby high-brightness region may be reduced.

Moreover, while an example in which brightness is reduced so that display brightness becomes equal to the threshold THave has been described in the present embodiment, alternatively, brightness may be reduced so that display brightness falls below the threshold THave.

Moreover, the process of S505 may be performed before S503. Specifically, a feature amount of the nearby high-brightness region may be acquired after detecting the nearby high-brightness region. In other words, a feature amount need not be acquired for a high-brightness region that is not a nearby high-brightness region.

<Eighth Embodiment>

Hereinafter, an image processing apparatus and an image processing method according to an eighth embodiment of the present invention will be described.

In the first to seventh embodiments, examples in which an image processing apparatus performs a process for compositing a graphic image have been described. In the present embodiment, an example where a combined image in which a graphic image is combined on a non-combined image that is an HDR image is input to an image processing apparatus will be described.

Moreover, while an example in which an image processing apparatus is provided in a display apparatus will be described in the present embodiment, the display apparatus and the image processing apparatus may be separate apparatuses as described in the first embodiment.

Hereinafter, differences from the sixth and seventh embodiments will be described and functions and the like that are similar to those of the sixth and seventh embodiments will not be described.

Moreover, while a configuration based on the sixth and seventh embodiments will be described in the present embodiment, a combined image may be input to the image processing apparatus according to the first to fifth embodiments. For example, a combined image in which a graphic image is combined on a base image may be input to the image processing apparatus according to the first to fifth embodiments.

Figure 18:
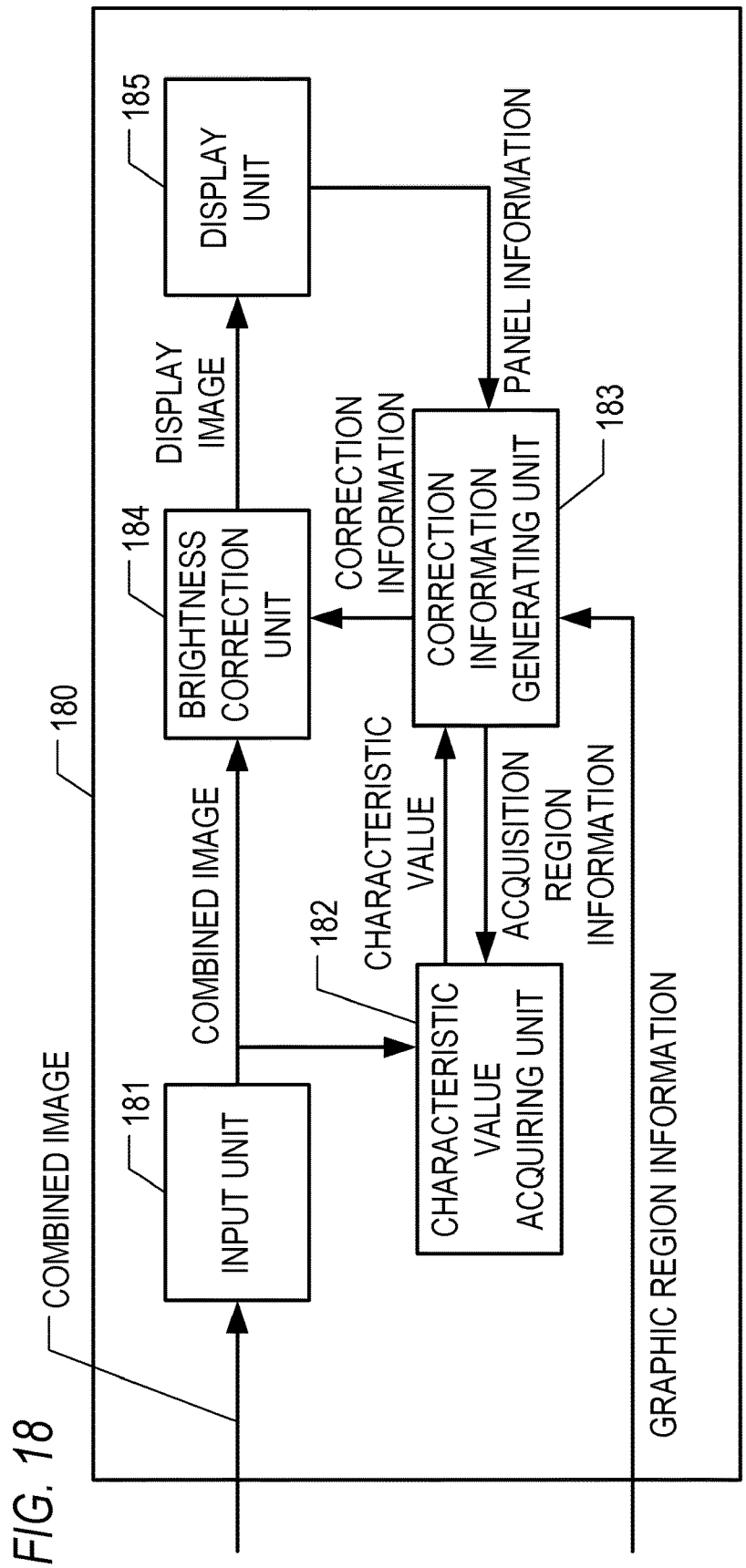
FIG. 18 is a diagram showing a functional configuration of a display apparatus according to an eighth embodiment.

Respective functional units of the display apparatus according to the present embodiment will now be described with reference to FIG. 18. FIG. 18 is a block diagram showing an example of a functional configuration of a display apparatus 180 according to the present embodiment.

As shown in FIG. 18, the image processing apparatus 180 includes an input unit 181, a feature amount acquiring unit 182, a correction information generating unit 183, a brightness correcting unit 184, a display unit 185, and the like.

The input unit 181 acquires a combined image (an image in which a graphic image is combined on a non-combined image that is an HDR image) from outside the display apparatus 180. In addition, in a similar manner to the drawing unit 124 according to the sixth embodiment, the input unit 181 outputs the acquired combined image to the feature amount acquiring unit 182 and the brightness correcting unit 184. Alternatively, the acquired combined image may be output to the feature amount acquiring unit 182, the brightness correcting unit 184, and the correction information generating unit 183 in a similar manner to the drawing unit 124 according to the seventh embodiment. The input unit 181 includes, for example, an input terminal to which image data is input and a processing circuit thereof. A terminal conforming to a communication standard such as DVI and HDMI (registered trademark) can be used as the input terminal.

The feature amount acquiring unit 182 has the same function as the feature amount acquiring unit 125 according to the sixth and seventh embodiments.

The correction information generating unit 183 has the same function as the correction information generating unit 126 according to the sixth embodiment. However, in the present embodiment, panel information is acquired from the display unit 185. In addition, in the present embodiment, graphic region information is acquired from outside the display apparatus 180.

Moreover, the display apparatus 180 may include a detecting unit which detects a region of a graphic image among a region of a combined image by analyzing the combined image. In such a case, graphic region information may be acquired from the detecting unit instead of from outside of the display apparatus 180.

Alternatively, the correction information generating unit 183 may have the same function as the correction information generating unit 126 according to the seventh embodiment.

The brightness correcting unit 184 has the same function as the brightness correcting unit 127 according to the sixth and seventh embodiments. However, in the present embodiment, the brightness correcting unit 184 outputs a display image to the display unit 185.

The display unit 185 is a display panel including an image displaying element and a control circuit thereof. The display unit 185 displays the display image output from the brightness correcting unit 184.

A processing procedure of the display apparatus 180 is the same as in the sixth and seventh embodiments (FIG. 13) with the exception of acquiring a combined image and graphic region information from the outside.

Specifically, the process of S201 is not performed and display of a display image is performed in S208. Since other processes (processes of S202 to S207) are the same as in the sixth and seventh embodiments, a description thereof will be omitted.

As described above, according to the present embodiment, brightness of a combined image acquired from the outside is corrected by a similar method to those described in the sixth and seventh embodiments. Accordingly, a similar effect to the sixth and seventh embodiments is obtained.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014514, filed on Jan. 29, 2014, which is hereby incorporated by reference herein in its entirety.

What is claimed is:

1. An image processing method comprising:
generating a combined image in which a second image is combined on a first image; and
outputting the combined image, wherein
when generating a combined image in which a second image with a narrower dynamic range than the first image is combined on the first image, a combined image in which brightness of at least one region among a region of the second image and a region of a periphery thereof is limited to a first threshold or lower is generated.

2. An image processing apparatus comprising:
a processor; and
a memory storing a program which, when executed by the processor, causes the image processing apparatus to execute:
generating a combined image in which a second image is combined on a first image; and
outputting the combined image, wherein
when generating a combined image in which a second image with a narrower dynamic range than the first image is combined on the first image, a combined image in which brightness of at least one region among a region of the second image and a region of a periphery thereof is limited to a first threshold or lower is generated.

3. The image processing apparatus according to claim 2, wherein
brightness of the combined image is limited by limiting brightness of the first image.

4. The image processing apparatus according to claim 3, wherein
the image processing apparatus caused by the program further executes acquiring a base image and difference information for generating the first image by extending a dynamic range of the base image,
the difference information is corrected, and
the combined image is generated using the difference information after correction, the base image, and the second image.

5. The image processing apparatus according to claim 4, wherein
the difference information is brightness ratio information representing, for each pixel, a ratio between a gradation value before extending a dynamic range and a gradation value after extending the dynamic range.

6. The image processing apparatus according to claim 4, wherein
the difference information is a tone map representing a correspondence relationship between a gradation value before extending a dynamic range and a gradation value after extending the dynamic range.

7. The image processing apparatus according to claim 2, wherein
the second image is an image having set transparency, and brightness of the combined image is limited by correcting the transparency of the second image.

8. The image processing apparatus according to claim 2, wherein
a combined image in which brightness is not limited is generated, and
brightness of the combined image in which brightness is not limited is limited in order to generate the combined image in which brightness is limited.

9. The image processing apparatus according to claim 2, wherein
a nearby high-brightness region which includes a pixel with a gradation value equal to or higher than a second threshold and the distance of which from the second image is equal to or less than a third threshold is detected, and
a combined image in which brightness of the nearby high-brightness region is limited to the first threshold or lower is generated.

10. The image processing apparatus according to claim 2, wherein
the combined image is generated for each frame,
the combined image is outputted to a display unit,
the display unit displays the combined image for each frame,
the image processing apparatus caused by the program further executes determining whether or not attention of a user is focused on the second image in the displayed combined image based on a region of the second image, and
a process for generating the combined image in which brightness is limited is omitted when it is determined that the attention of the user is not focused on the second image.

11. The image processing apparatus according to claim 10, wherein
when a user operation with respect to the second image has not been performed for a period of time equal to or longer than a fourth threshold, it is determined that the attention of the user is not focused on the second image.

12. The image processing apparatus according to claim 10, wherein
when a region of the second image is changing at a higher rate than a fifth threshold, it is determined that the attention of the user is not focused on the second image.

13. The image processing apparatus according to claim 2, wherein
the image processing apparatus caused by the program further executes determining whether or not the first image is an HDR image, wherein
the combined image in which brightness is limited is generated when the first image is determined to be the HDR image.

14. The image processing apparatus according to claim 13, wherein
it is determined that the first image is an HDR image when the number of bits in the first image is equal to or larger than 8.

15. The image processing apparatus according to claim 13, wherein
it is determined that the first image is an HDR image when a data format of the first image is a floating point format.

16. The image processing apparatus according to claim 13, wherein
it is determined that the first image is an HDR image when a data format of the first image is an OpenEXR format.

17. The image processing apparatus according to claim 13, wherein
it is determined that the first image is an HDR image when a base image and difference information for generating the first image are input to the image processing apparatus.

18. The image processing apparatus according to claim 2, wherein the first threshold is a value corresponding to brightness of the second image.

19. The image processing apparatus according to claim 2, wherein the first threshold is 100 [$cd/m^2$].

20. The image processing apparatus according to claim 2, wherein brightness of the second image is lower than brightness of the first image.

21. A non-transitory computer readable medium that stores a program, wherein
the program causes a computer to execute the image processing method,
the image processing method includes:
generating a combined image in which a second image is combined on a first image; and
outputting the combined image, and
when generating a combined image in which a second image with a narrower dynamic range than the first image is combined on the first image, a combined image in which brightness of at least one region among a region of the second image and a region of a periphery thereof is limited to a first threshold or lower is generated.

22. A display apparatus comprising:
the image processing apparatus according to claim 2;
a light-emitting unit;
a display unit configured to display age on a screen by modulating light emitted from the light-emitting unit;

a processor; and a memory storing a program which, when executed by the processor, causes the display apparatus to execute controlling emission brightness of the light-emitting unit, wherein when a combined image, in which a second image with a narrower dynamic range than a first image is combined on the first image, is generated, the emission brightness of the light-emitting unit is limited so that display brightness of at least one region among a region of the second image and a region of a periphery thereof is limited to a threshold or lower.

23. An image processing method comprising:

generating a combined image in which a second image is combined on a first image; and outputting the combined image, wherein when generating a combined image in which a second image with a narrower dynamic range than the first image is combined on the first image, a combined image in which brightness of at least one region among a region of the second image and a region of a periphery thereof is reduced is outputted.

24. An image processing apparatus comprising:

a processor; and a memory storing a program which, when executed by the processor, causes the image processing apparatus to execute:

generating a combined image in which a second image is combined on a first image; and outputting the combined image, wherein when generating a combined image in which a second image with a narrower dynamic range than the first image is combined on the first image, a combined image in which brightness of at least one region among a region of the second image and a region of a periphery thereof is reduced is outputted.

25. The image processing apparatus according to claim 24, wherein brightness of the combined image is reduced by reducing brightness of the first image.

26. The image processing apparatus according to claim 24, wherein the second image is an image having set transparency, and brightness of the combined image is reduced by correcting the transparency of the second image.

27. The image processing apparatus according, to claim 24, wherein a combined image in which brightness of a nearby high-brightness region is reduced is outputted, the nearby high-brightness region including a pixel with a gradation value equal to or higher than a first threshold, and the distance from the second image to the nearby high-brightness region being equal to or less than a second threshold.

28. The image processing apparatus according to claim 24, wherein the image processing apparatus caused by the program further executes determining whether or not the first image is an HDR image, wherein the combined image in which brightness is reduced is outputted when the first image is determined to be the HDR image.

29. The image processing apparatus according to claim 24, wherein brightness of the second image is lower than brightness of the first image.

30. A display apparatus comprising:

the image processing apparatus according to claim 24;

a light-emitting unit;

a display unit configured to display an image on a screen by imodulating light emitted from the light-emitting unit;

a processor; and a memory storing a program which, when executed by the processor causes the display apparatus to execute controlling emission brightness of the light-emitting unit, wherein when a combined image, in which a second image with a narrower dynamic range than a first image is combined on the first image, is generated, the emission brightness of the light-emitting unit is reduced so that display brightness of at least one region among a region of the second image and a region of a periphery thereof is reduced.

* * * * *